US008139626B2

(12) United States Patent
Galli et al.

(10) Patent No.: US 8,139,626 B2
(45) Date of Patent: Mar. 20, 2012

(54) COMMUNICATION APPARATUS, COMMUNICATION METHOD, CIRCUIT MODULE AND INTEGRATED CIRCUIT

(75) Inventors: Stefano Galli, Morristown, NJ (US); Akio Kurobe, Osaka (JP); Hisao Koga, Fukuoka (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 831 days.

(21) Appl. No.: 12/249,109

(22) Filed: Oct. 10, 2008

(65) Prior Publication Data

US 2009/0103642 A1  Apr. 23, 2009

(30) Foreign Application Priority Data

Oct. 12, 2007  (JP) ................ P2007-266950

(51) Int. Cl.
*H04B 1/38* (2006.01)
*H04L 12/43* (2006.01)

(52) U.S. Cl. ...................... 375/222; 370/458
(58) Field of Classification Search .......... 375/219, 375/222, 257, 260, 319, 295, 316; 370/437–439, 370/445, 458, 462
See application file for complete search history.

(56) References Cited

U.S. PATENT DOCUMENTS

| 6,804,209 | B1* | 10/2004 | Sugaya et al. | 370/328 |
|---|---|---|---|---|
| 6,836,469 | B1* | 12/2004 | Wu | 370/322 |
| 6,845,106 | B2* | 1/2005 | McKinnon et al. | 370/477 |
| 6,876,643 | B1* | 4/2005 | Aggarwal et al. | 370/338 |
| 7,042,897 | B1 | 5/2006 | Sivaprakasam | |
| 7,653,012 | B2* | 1/2010 | Ayyagari et al. | 370/257 |
| 7,742,393 | B2* | 6/2010 | Bonicatto et al. | 370/216 |
| 2007/0121676 | A1 | 5/2007 | Koga | |
| 2008/0088418 | A1* | 4/2008 | Sugita | 340/310.11 |

FOREIGN PATENT DOCUMENTS

| EP | 0 503 212 | 9/1992 |
|---|---|---|
| EP | 1 324 522 | 7/2003 |
| JP | 2007-135180 | 5/2007 |
| WO | 02/37752 | 5/2002 |

OTHER PUBLICATIONS

D. Mestdagh et al., "A Method to Reduce the Probability of Clipping in DMT-Based Transceivers," IEEE Transactions on Communications, vol. 44, No. 10, Oct. 1996, pp. 1234-1238.
International Search Report dated Mar. 10, 2009.

* cited by examiner

*Primary Examiner* — Khanh C Tran
(74) *Attorney, Agent, or Firm* — Dickinson Wright PLLC

(57) ABSTRACT

In communication method for communicating via a transmission channel to which first communication apparatuses communicating based on a first communication system, second communication apparatuses communicating based on a second communication system, and third communication apparatuses communicating based on a third communication system are connected, a data transmission domain and a notification domain for notifying a data transmission within the data transmission domain are allocated to the first communication apparatuses, the second communication apparatuses, and the third communication apparatuses, respectively. In the communication method, notices of the data transmission for each of the first communication apparatuses, the second communication apparatuses and the third communication apparatuses are transmitted within the notification domain, and the data transmission domain is reallocated in accordance with the notices transmitted from the first, second and third communication apparatuses.

20 Claims, 19 Drawing Sheets

FIG. 16

| EXISTING NOTIFICATION SIGNAL | COMMUNICATION SYSTEMS WHICH ARE ALLOCATED TO DATA SLOTS OF CONTROL CYCLE "T" | | | | | | | | | |
|---|---|---|---|---|---|---|---|---|---|---|
| | S0 | S1 | S2 | S3 | S4 | S5 | S6 | S7 | S8 | S9 |
| A, B, C, D | D | A | B | C | A | B | C | A | B | C |
| A, B, C | AorBorC | A | B | C | A | B | C | A | B | C |
| A, B | A | A | B | B | A | B | A | A | B | B |
| A, C | A | A | C | C | A | A | C | A | C | C |
| B, C | B | C | B | C | B | B | C | C | B | C |
| A | A | A | A | A | A | A | A | A | A | A |
| B | B | B | B | B | B | B | B | B | B | B |
| C | C | C | C | C | C | C | C | C | C | C |
| D | D | D | D | D | D | D | D | D | D | D |

FIG. 17

| EXISTING NOTIFICATION SIGNAL | COMMUNICATION SYSTEMS WHICH ARE ALLOCATED TO DATA SLOTS OF CONTROL CYCLE "T" | | | | | | | | | |
|---|---|---|---|---|---|---|---|---|---|---|
| | S0 | S1 | S2 | S3 | S4 | S5 | S6 | S7 | S8 | S9 |
| A, B, C, D | 0 | 1 | 0 | 0 | 1 | 0 | 0 | 1 | 0 | 0 |
| A, B, C | 1 | 1 | 0 | 0 | 1 | 0 | 0 | 1 | 0 | 0 |
| A, B | 1 | 1 | 0 | 0 | 1 | 0 | 1 | 1 | 0 | 0 |
| A, C | 1 | 1 | 0 | 0 | 1 | 1 | 0 | 1 | 0 | 0 |
| B, C | 0 | 0 | 0 | 0 | 0 | 0 | 0 | 0 | 0 | 0 |
| A | 1 | 1 | 1 | 1 | 1 | 1 | 1 | 1 | 1 | 1 |
| B | 0 | 0 | 0 | 0 | 0 | 0 | 0 | 0 | 0 | 0 |
| C | 0 | 0 | 0 | 0 | 0 | 0 | 0 | 0 | 0 | 0 |
| D | 0 | 0 | 0 | 0 | 0 | 0 | 0 | 0 | 0 | 0 |

FIG. 18

| EXISTING NOTIFICATION SIGNAL | COMMUNICATION SYSTEMS WHICH ARE ALLOCATED TO DATA SLOT OF CONTROL CYCLE "T" | | | | | | | | | |
|---|---|---|---|---|---|---|---|---|---|---|
| | S0 | S1 | S2 | S3 | S4 | S5 | S6 | S7 | S8 | S9 |
| A, B, C | C | A | B | A | B | C | A | B | A | B |
| A, B | A | B | A | B | A | B | A | B | A | B |
| A | A | A | A | A | A | A | A | A | A | A |
| B | B | B | B | B | B | B | B | B | B | B |
| C | C | C | C | C | C | C | C | C | C | C |

FIG. 20

| EXISTING NOTIFICATION SIGNAL | COMMUNICATION SYSTEMS WHICH ARE ALLOCATED TO DATA SLOTS OF CONTROL CYCLE "T" | | | | | | | | | |
|---|---|---|---|---|---|---|---|---|---|---|
| | S0 | S1 | S2 | S3 | S4 | S5 | S6 | S7 | S8 | S9 |
| A, B, C, D | D | A | B | C | A | A | C | A | B | C |
| A, B, C | AorC | A | B | C | A | A | C | A | B | C |
| A, B | A | A | B | A | A | A | A | A | B | A |
| A, C | A | A | C | C | A | A | C | A | C | C |
| B, C | C | C | B | C | C | C | C | C | B | C |
| A | A | A | A | A | A | A | A | A | A | A |
| B | — | — | B | — | — | — | — | — | B | — |
| C | C | C | C | C | C | C | C | C | C | C |
| D | D | D | D | D | D | D | D | D | D | D |

COMMUNICATION APPARATUS, COMMUNICATION METHOD, CIRCUIT MODULE AND INTEGRATED CIRCUIT

BACKGROUND

1. Technical Field

The present invention is related to a communication apparatus, a communication method, a circuit module and an integrated circuit, which perform multi-carrier communication operations among a plurality of communication apparatuses, while these communication apparatuses are connected to a transmission channel and share a communication band.

2. Background Art

Since transmission systems such as the OFDM (Orthogonal Frequency Division Multiplexing) system using a plurality of sub-carriers have such a great merit that high quality communications can be carried out even in a severe transmission channel, these transmission systems are utilized not only in wireless communications, but also in wired communications such as power line communications. Generally speaking, frequency bands from 2 MHz to 30 MHz are used as the frequency bands of the power line communications (refer to, for example, Patent Publication 1). In addition, technical ideas capable of utilizing broadband covering higher frequency bands than the above-described frequency band are recently considered.

Also, other technical ideas capable of equalizing levels of time waveforms in order not produce peaks and capable of suppressing interference and the like are proposed in multi-carrier communications with employment of a plurality of sub-carriers. In the above-described peak suppressing technical ideas, in such a case that a large peak is not present in time waveforms, phases of respective sub-carriers are rotated by using a default phase vector, whereas in such a case that a large peak may be monitored, a phase vector is changed so as to search such a phase vector by which the peak is not produced. Then, the phases of the respective sub-carriers are rotated by the searched phase vector (refer to, for example, Non-patent Publication 1). In multi-carrier communications, such peak suppressing technical ideas constitute essential techniques to decrease a difficulty in design of power amplifiers.

In the case that a plurality of different logic networks are formed by employing communication apparatuses such as power line communication apparatuses connected to transmission channels, security among these different networks is maintained by employing network keys and the like. In general, technical specifications of these communication apparatuses connected to the respective networks are identical to each other. In other words, phase vectors which are employed in order to suppress peaks are also identical to each other. With employment of the above-described technical ideas, even among the networks which are different from each other in physical layer levels of communication apparatuses, signals of the respective networks can be sensed (carrier sensing is available); if the CSMA (Carrier Sense Multiple Access) technique and the like are utilized, then it is possible to suppress collisions of signals; and even when the different networks are present relatively close to each other, communications can be smoothly carried out.

The technical idea described in the Patent Publication 1 has the following purpose: That is, even in such a case that the plural sorts of communication apparatuses whose communication systems are different from each other are connected to the shared transmission channel, the collisions of the signals are avoided without executing the demodulating process operation and the like which may cause relatively heavy loads, and signals outputted from other communication apparatuses can be readily sensed. In accordance with this technical idea, such a condition for indicating whether or not a communication request signal of a control period is present may change a slot allocation of a data period subsequent to the control period. Then, since a communication request signal is rotated by a phase vector, the communication request signal can be firmly sensed. However, a detailed description is not made of a slot allocation of a data domain. Thus, in this technical idea, there are some possibilities that data capable of satisfying a required delay time cannot be firmly transmitted.

[Patent Publication 1] JP-A-2007-135180
[Non-patent Publication 1] Denis J. G. Mestdagh and Paul M. P. Spruyt, "A Method to Reduce the Probability of Clipping in DMT-Based Transceivers", IEEE Transactions on Communications, Volume 44, No. 10, pages 1234 to 1238, in 1996

SUMMARY

The present invention has been made to solve the above-described problems, and therefore, has an object to provide a communication apparatus, a communication method, a circuit module and an integrated circuit, by which even when plural sorts of communication apparatuses whose communication systems are different from each other are connected to a shared transmission channel, while limit of delays in response to data which are tried to be transmitted by the respective communication apparatuses can be satisfied, signals can be transmitted in a higher efficiency by avoiding collisions of signals. Also, another object of the present invention is to provide a communication method, a communication apparatus and a communication system, which are capable of reducing processing workloads for allocating slots executed by the communication apparatuses in order to avoid collisions of the signals.

According to the invention, there is provided a communication apparatus for communicating based on a first communication system, via a transmission channel to which a first other communication apparatus communicating based on the first communication system, second other communication apparatuses communicating based on a second communication system, and third other communication apparatuses communicating based on a third communication system are connected, wherein a data transmission domain and a notification domain for notifying a data transmission within the data transmission domain are allocated to the communication apparatus and the first other communication apparatus, the second other communication apparatuses, and the third other communication apparatuses, respectively, the communication apparatus, including:

a detector which detects a notice transmitted from the first, second and third other communication apparatuses within the notification domain;

a transmitter which transmits a notice for the data transmission within the notification domain; and a controller which reallocates the data transmission domain in accordance with the notice transmitted from the first, second and third other communication apparatuses and the notice transmitted from the transmitter.

According to the invention, there is provided a communication method of a communication apparatus for communicating based on a first communication system, via a transmission channel to which a first other communication apparatus communicating based on the first communication system, second other communication apparatuses communicating based on a second communication system, and third other communication apparatuses communicating based on a third communication system are connected, wherein a data transmission domain and a notification domain for notifying a data transmission within the data transmission domain are allocated to the communication apparatus and the first other communication apparatus, the second other communication apparatuses, and the third other communication apparatuses, respectively, the communication method, including:

detecting a notice transmitted from the first, second and third other communication apparatuses within the notification domain;

transmitting a notice for the data transmission within the notification domain; and reallocating the data transmission domain in accordance with the notice transmitted from the first, second and third other communication apparatuses and the notice transmitted from the transmitter.

According to the invention, there is provided a circuit module of a communication apparatus for communicating based on a first communication system, via a transmission channel to which a first other communication apparatus communicating based on the first communication system, second other communication apparatuses communicating based on a second communication system, and third other communication apparatuses communicating based on a third communication system are connected, wherein a data transmission domain and a notification domain for notifying a data transmission within the data transmission domain are allocated to the communication apparatus and the first other communication apparatus, the second other communication apparatuses, and the third other communication apparatuses, respectively, the circuit module, including:

a coupler for interfacing with the transmission channel;

a detector which detects a notice transmitted from the first, second and third other communication apparatuses within the notification domain via the coupler;

a transmitter which transmits a notice for the circuit module within the notification domain; and a controller which reallocates the data transmission domain in accordance with the notice transmitted from the first, second and third other communication apparatuses and the notice transmitted from the transmitter.

According to the invention, there is provided an integrated circuit of a communication apparatus for communicating based on a first communication system, via a transmission channel to which a first other communication apparatus communicating based on the first communication system, second other communication apparatuses communicating based on a second communication system, and third other communication apparatuses communicating based on a third communication system are connected, wherein a data transmission domain and a notification domain for notifying a data transmission within the data transmission domain are allocated to the communication apparatus and the first other communication apparatus, the second other communication apparatuses, and the third other communication apparatuses, respectively, the integrated circuit, including:

a detector which detects a notice transmitted from the first, second and third other communication apparatuses within the notification domain via a coupler for interfacing with the transmission channel;

a transmitter which transmits a notice for the data transmission within the notification domain via the coupler; and a controller which reallocates the data transmission domain in accordance with the notice transmitted from the first, second and third other communication apparatuses and the notice transmitted from the transmitter.

According to the invention, there is provided a communication method for communicating via a transmission channel to which first communication apparatuses communicating based on a first communication system, second communication apparatuses communicating based on a second communication system, and third communication apparatuses communicating based on a third communication system are connected, wherein a data transmission domain and a notification domain for notifying a data transmission within the data transmission domain are allocated to the first communication apparatuses, the second communication apparatuses, and the third communication apparatuses, respectively, the communication method, including:

transmitting notices of the data transmission for each of the first communication apparatuses, the second communication apparatuses and the third communication apparatuses within the notification domain; and reallocating the data transmission domain in accordance with the notice transmitted from the first, second and third communication apparatuses.

According to the invention, even when plural sorts of communication apparatuses whose communication systems are different from each other are connected to a shared transmission channel, while limit of delays in response to data which are tried to be transmitted by the respective communication apparatuses can be satisfied, signals can be transmitted in a higher efficiency by avoiding collisions of signals. Also, it is possible to provide a communication apparatus for reducing processing workloads for allocating slots executed by the communication apparatuses in order to avoid collisions of the signals.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein:

FIG. 16 is a diagram for showing a table indicative of a communication systems which is allocated to notification signals and data slots of a control cycle "T" in the power line communication system according to the embodiment of the present invention;

FIG. 17 is a diagram for representing one example as to a binary table for indicating whether or not notification signals and data slots of the control cycle "T" can be used in the power line communication system according to the embodiment of the present invention;

FIG. 18 is a diagram for showing another table indicative of a communication systems which is allocated to notification signals and data slots of a control cycle "T" in the power line communication system according to the embodiment of the present invention;

FIG. 20 is a diagram for showing another table indicative of a communication systems which is allocated to notification signals and data slots of a control cycle "T" in the power line communication system according to the embodiment of the present invention.

DETAILED DESCRIPTION

Referring now to drawings, a description is made of various embodiments of the present invention. It should be understood that although both a power line communication apparatus and a power line communication system will be exemplified in the below-mentioned descriptions, the present invention may be similarly applied to other communication apparatuses and other communication systems such as wireless LANs (Local Area Networks).

Figure 1:
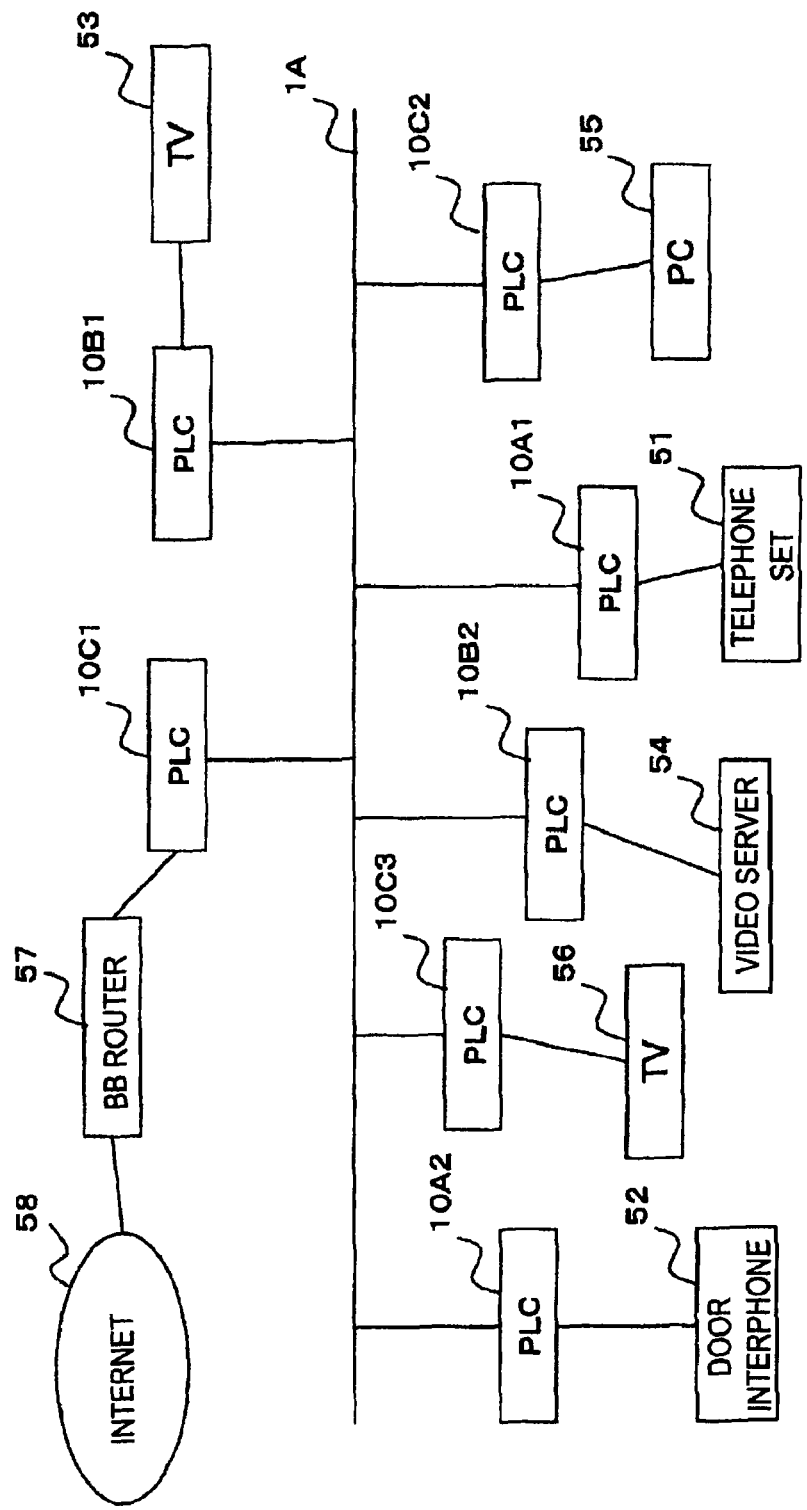
FIG. 1 is a diagram for schematically showing an example of an arrangement of a power line communication system for realizing a communication method and a communication system of the present invention.

FIG. 1 is a diagram for schematically showing one example as to an arrangement of a power line communication system which realizes the communication method and the communication system, according to an embodiment of the present invention. The power line communication system of FIG. 1 is equipped with a plurality of PLC (Power Line Communication) modems 10A1, 10A2, 10B1, 10B2, 10C1, 10C2, and 10C3, which are connected to a power line 1A. In the below-mentioned descriptions, when individual PLC modems are referred to, the PLC modems 10A1, 10A2, 10B1, 10B2, 10C1, 10C2, and 10C3 are described respectively, whereas when a PLC modem is generally referred to, a PLC modem 10 is simply described.

In FIG. 1, the power line 1A is illustrated by employing a single line. However in an actual case, the power line 1A is made of two, or more pieces of conducting lines, and the PLC modem 10 is connected to two conducting lines among these conducting lines.

As will be later described in detail, the PLC modems 10 contain LAN modular jacks such as RJ45. A telephone set 51 equipped with a display device, a door interphone 52, televisions (TV) 53 and 56, a video server 54, a personal computer (PC) 55, and a broadband router (BB router) 57 are connected to these modular jacks, while the broadband router 57 is connected to the Internet 58.

The PLC modems 10A1, 10A2, 10B1, 10B2, 10C1, 10C2, and 10C3, which constitute the power line communication system of FIG. 1, perform communication operations based upon three different sorts of communication systems, namely, the PLC modems 10A1 and 10A2 perform communication operations based upon a communication system "A"; the PLC modems 10B1 and 10B2 perform communication operations based upon a communication system "B"; and the PLC modems 10C1, 10C2 and 10C3 perform communication operations based upon a communication system "C." It should be understood that although the above-described communication systems "A" to "C" indicate various sorts of specifications such as protocols, modulation systems, and frequency bands, these communication systems "A" to "C" correspond to the same communication systems in view of such an operation that the multi-carrier communication of the OFDM (Orthogonal Frequency Division Multiplexing) system is carried out. Since the power line communication system corresponds to one example of communication systems capable of realizing the communication system according to the present invention, other communication systems such as wireless LANs may be alternatively employed in order to realize the above-described communication method.

Figure 2A:
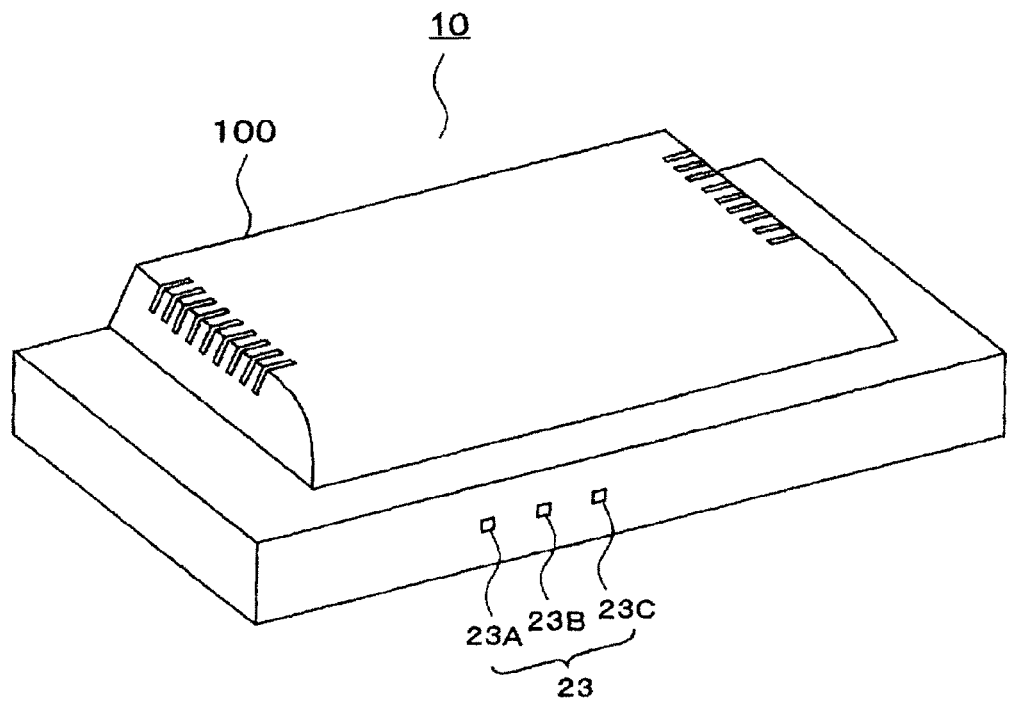
FIGS. 2A and 2B are diagrams for representing outer appearances of a PLC modem according to an embodiment of the present invention.
Figure 2B:
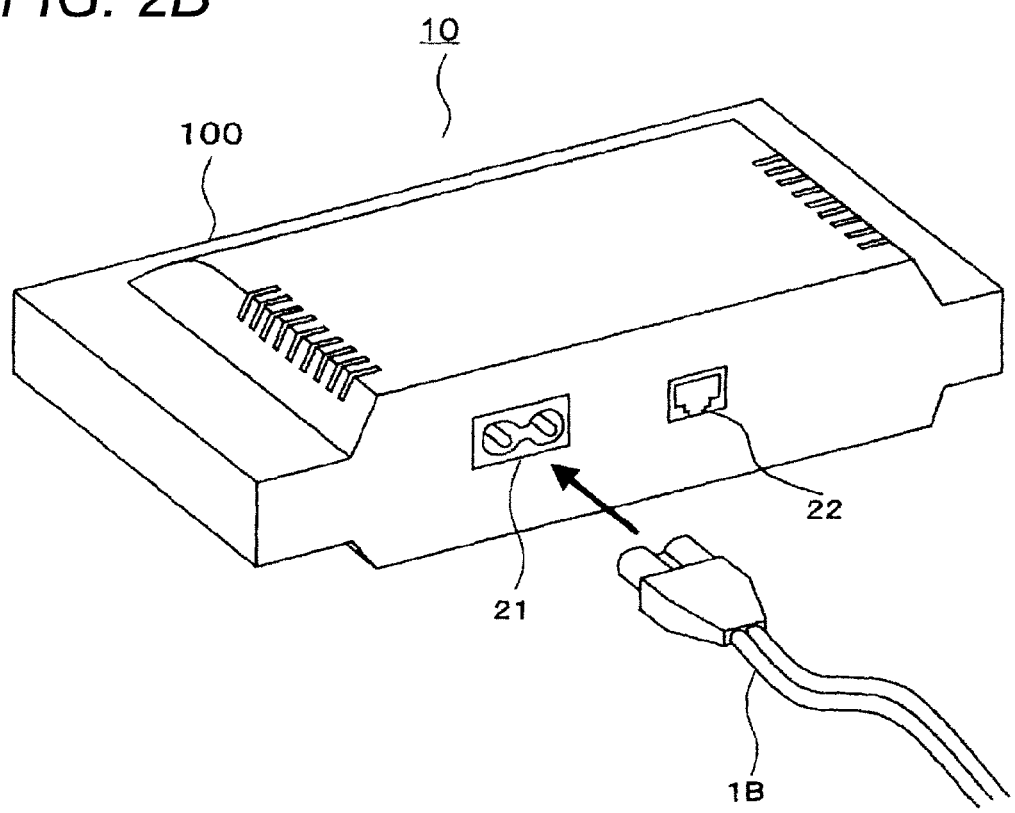

Next, a concrete structural example of the PLC modem 10 is shown in FIG. 1. FIGS. 2A and 2B are diagrams for illustratively showing outer appearances of a PLC modem 10; concretely speaking, FIG. 2A is an outer appearance perspective view for representing a front plane of this PLC modem 10; and FIG. 2B is a rear view of the PLC modem 10. The PLC modem 10 shown in FIG. 2 contains a housing 100, and an indicator 23 is provided on a front plane of the housing 100. As indicated in FIG. 2A, the indicator 23 is constituted by LEDs (Light Emitting Diodes) 23A, 23B and 23C. Also, as represented in FIG. 2B, a power supply connector 21 and a LAN (Local Area Network) modular jack 22 such as RJ45 are provided on a rear plane of the housing 100. A power supply cable 1B is connected to the power supply connector 21; and a LAN cable (which is not indicated in FIG. 2) is connected to the modular jack 23. It should also be understood that while a D-Sub (D-subminiature) connector may be provided in the PLC modem 10, a D-Sub cable may be alternatively connected to this D-Sub connector.

Figure 3:
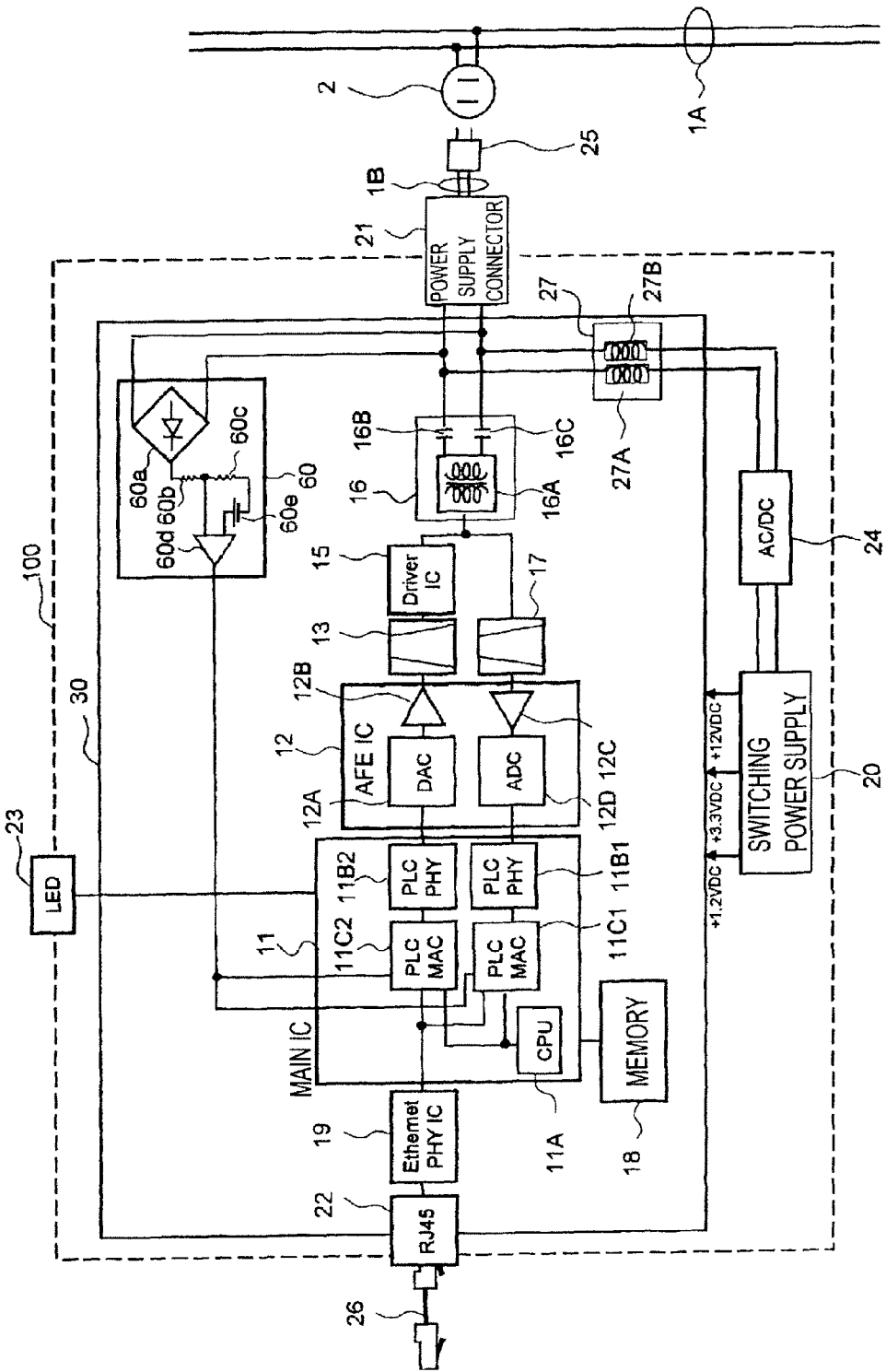
FIG. 3 is a block diagram for indicating one example as to hardware of the PLC modem according to the embodiment of the present invention.

FIG. 3 is a block diagram for representing one example as to hardware of the PLC modem 10. As shown in FIG. 3, the PLC modem 10 is equipped with a circuit module 30 and a switching power supply 20. The switching power supply 20 is employed in order to apply various sorts of voltages (for example, +1.2 V, +3.3 V, and +12 V) to the circuit module 30. The switching power supply 20 contains, for example, a switching transformer, and a DC/DC converter (both elements are not shown). Electric power is supplied to the switching power supply 20 from a power supply connector 21 via an impedance upper 27 and an AC/DC converter.

In a circuit module 30, a main IC (Integrated circuit) 11, an AFE•IC (Analog Front End IC) 12, a low-pass filter (LPF) 13, a driver IC 15, a coupler 16, a band-pass filter (BPF) 17, a memory 18, an Ethernet PHY•IC (Physical layer-Integrated Circuit) 19, and an AC cycle detector 60 are provided. The coupler 16 is connected to the power supply connector 21, and is further connected to the power line 1A via the power line 1B, the power supply plug 25, and an outlet 2. Also, the indicator 23 is connected to the main IC 11, and a LAN cable 26 is connected to the modular jack 22 in order to be connected to an electric appliance such as a personal computer. It should also be noted that the main IC 11 functions as a communication control unit in such a case that the main IC 11 performs a power line communication.

The main IC 11 is constituted by a CPU (Central Processing Unit) 11A, PLC•MAC (Power Line Communication/Media Access Control layer) blocks 11C1 and 11C2, and PLC•PHY (Power Line Communication/Physical layer) blocks 11B1 and 11B2. The CPU 11A implements a 32-bit RISC (Reduced Instruction Set Computer) processor. The PLC•MAC block 11C2 manages a MAC layer (Media Access Control layer) of a transmission signal, and the PLC•MAC block 11C1 manages a MAC layer of a reception signal. Also, the PLC•PHY block 11B2 manages a PHY layer (Physical layer) of the transmission signal, and the PLC•PHY block 11B1 manages a PHY layer of the reception signal. The AFE•IC 12 is arranged by a D/A converter (DAC) 12A, an A/D converter (ADC) 12D, and variable gain amplifiers (VGA) 12B and 12C. The coupler 16 is constituted by a coil transformer 16A and coupling capacitors 16B and 16C. It should also be understood that the CPU 11A controls operations of the PLC•MAC blocks 11C, 11C2 and the PLC•PHY blocks 11B1, 11B2, and also, controls the entire operations of the PLC modem 10 by utilizing data stored in the memory 18.

In FIG. 3, while the PLC•MAC blocks 11C1 and 11C2 and the PLC•PHY blocks 11B1 and 11B2 are provided to be employed for transmission and reception, respectively. Alternatively, while a PLC•MAC block 11C and a PLC PHY block 11B (not shown) may be provided to share in transmission and reception operations.

Similar to a general modem, the main IC 11 is an electric circuit (LSI) which performs signal process operations including a basic control operation and modulating/demodulating operations so as to execute data communication operations. In other words, the main IC 11 modulates reception data outputted from a communication terminal such as a PC (Personal Computer), and then, outputs the modulated data as a transmission signal (transmission data) to the AFE•IC 12. Further, the main IC 11 demodulates a signal which is inputted from the side of the power line 1A via the AFE•IC 12, and then, outputs the demodulated signal as a reception signal to the communication terminal such as the PC.

The AC cycle detector 60 produces such a synchronization signal which is required in order that the respective PLC modems 10 execute control operations at common timing. The AC cycle detector 60 is arranged by a diode bridge 60a, resistors 60b and 60c, a DC power supply unit 60e, and a capacitor 60d. The diode bridge 60a is connected to the resistor 60b. The resistor 60b is connected series to the resistor 60c. Both the resistors 60b and 60c are connected parallel to one terminal of the capacitor 60d. The DC power supply unit 60e is connected to the other terminal of the capacitor 60d. Concretely speaking, the synchronization signal is processed in accordance with the below-mentioned manner. That is, the AC cycle detector 60 detects zero cross points of an AC power waveform AC of a commercial power supply, which is applied to the transmission channel 1A, namely, such zero cross points of AC voltage waveform constructed of a sine wave having a frequency of 50 Hz, or 60 HZ. Then, the AC cycle detector 60 produces a synchronism signal while the timing for detecting the zero cross points is defined as a reference. As one example of the above-described synchronization signal, a rectangular wave may be conceived which is constituted by a plurality of pulses synchronized with the zero cross points of the AC power waveform. The AC cycle detector 60 is not necessarily required. In this alternative case, the synchronization among these PLC modems 10 may be established by employing a synchronization signal contained in a communication signal.

A communication operation by the PLC modem 10 shown in FIG. 3 is roughly carried out as follows: That is, data inputted from the modular jack 22 is supplied via the Ethernet PHY•IC 19 to the main IC 11 and the supplied data is digitally processed, so that a digital transmission signal is produced which is D/A-converted into an analog signal by the D/A converter (DAC) 12A of the AFE•IC 12, and then, the analog signal is outputted to the power line 1A via the low-pass filter 13, the driver IC 15, the coupler 16, the power supply connector 21, the power supply cable 1B, the power supply plug 25, and also, the outlet 2.

A signal received from the power line 1A is supplied via the coupler 16 to the band-pass filter 17, and then, a gain of the supplied signal is adjusted by the variable gain amplifier (VGA) 12C of the AFE•IC 12. Thereafter, the gain-adjusted signal is A/D-converted by the A/D converter (ADC) 12D into a digital signal, and then, the digital signal is supplied to the main IC 11 so as to be digitally processed, so that the inputted analog signal is converted into the digital data. Then, this digital data is outputted via the Ethernet PHY•IC 19 from the modular jack 22.

Figure 4:
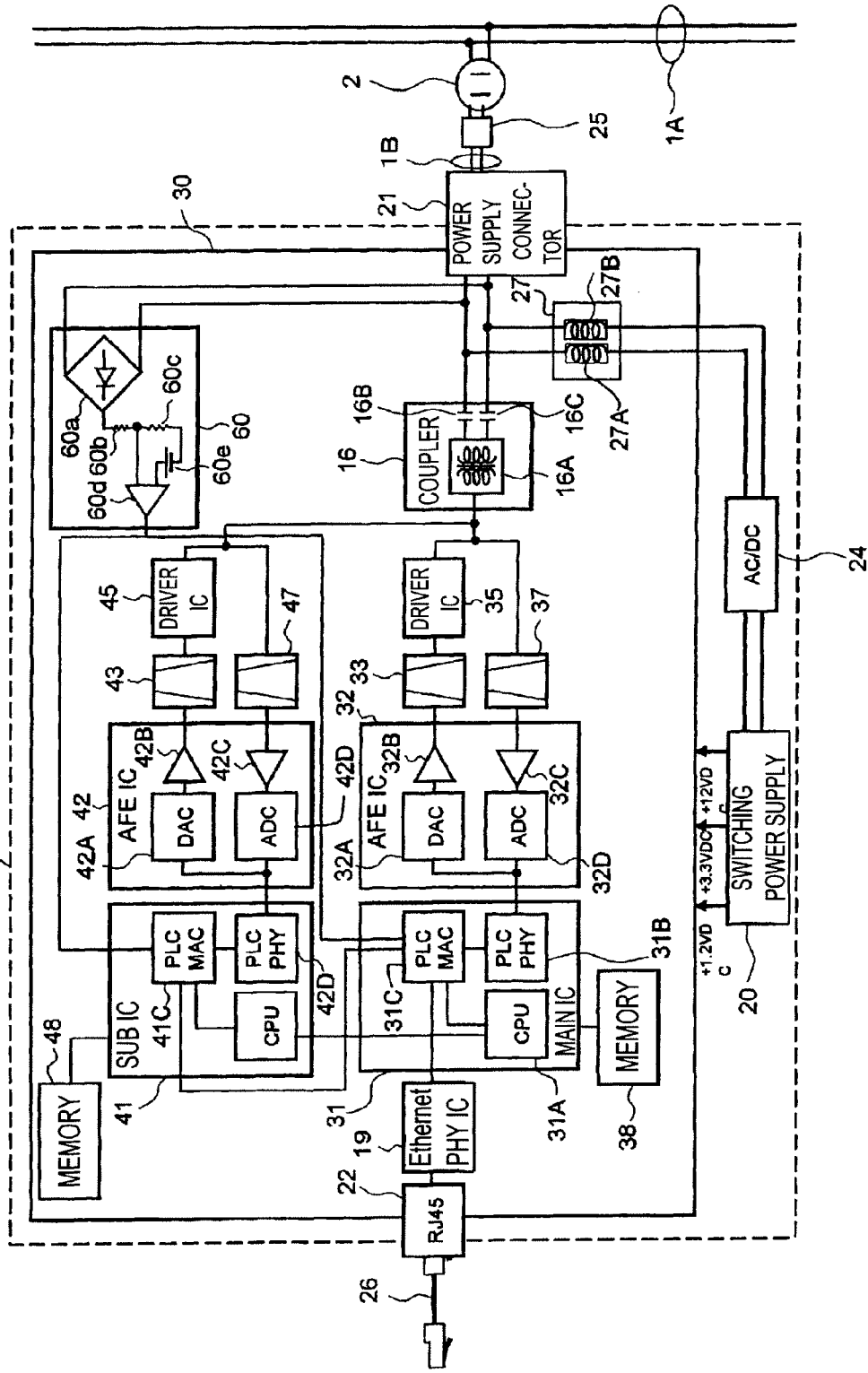
FIG. 4 is a block diagram for indicating another example as to hardware of the PLC modem according to the embodiment of the present invention.

FIG. 4 is a block diagram for showing another example as to the hardware of the PLC modem 10. As represented in FIG. 4, a PLC modem 10 contains two sets of hardware used to perform communication process operations, and other arrangements identical to the arrangements of the PLC modem 10 shown in FIG. 3. That is, while the PLC modem 10 of FIG. 4 contains both a circuit module 30 and a switching power supply 20, a power supply voltage is applied from the power supply connector 21 via the impedance upper 27 and the AC/DC converter 24 to the switching power supply 20.

A circuit module 30 is equipped with one hardware which is arranged by a main IC (Integrated Circuit) 31, an AFE•IC (Analog Front End/Integrated Circuit) 32, a low-pass filter (LPF) 33, and a driver IC 35 in order to perform one set of a communication process operation. The circuit module 30 is further equipped with another hardware which is arranged by a sub-IC 41, an AFE•IC 42, a low-pass filter 43, and a driver IC 45 in order to perform one set of a communication process operation. Since two sets of the above-described hardware are basically identical to the above-described main IC 11, AFE•IC 12, low-pass filter 13, and driver IC 15 of the PLC modem 10 shown in FIG. 3, detailed descriptions thereof will be omitted. Also, such a technical structure that a coupler 16, a band-pass filter (BPF) 17, a memory 18, and a Ethernet PHY•IC 19 are provided in the PLC modem 10 of FIG. 4 is identical to that of the PLC modem 10 of FIG. 3. The main IC 31 may also function a communication control operation in such a case that a power line communication operation is carried out. Also, the memory 48 stores thereinto data which is used by the sub-IC 41.

The power line communication system indicated in FIG. 1 performs a communication operation by such a manner that the PLC modem 10 connected to the power line 1A transmits a control signal for controlling communication operations among the PLC modems 10 within a control signal domain, and also, transmits data within a data signal domain subsequent to the above-described control signal domain. A signal domain for combining one control signal domain with a data signal domain subsequent to this control signal domain will be referred to as a communication cycle. As a consequence, a control signal domain is present at a head of each of these communication cycles.

A data signal domain corresponds to a time domain in which a plurality of control cycles are continuously provided, while each of the respective control cycles contains a plurality of data slots. A data slot corresponds to such a time domain that data supplied from a specific PLC modem are grouped, and then, the grouped data is transmitted. Since a control signal domain is provided at a head of a communication cycle, both a control cycle of the head of the communication cycle, and a head data slot of the head control cycle are made short by the control signal domain. A data slot is a data slot formed by the TDM (Time Division Multiplexing) system, and however, may contain a data slot formed by the FDM (Frequency Division Multiplexing).

A control signal which is transmitted within a control signal domain contains such a notification signal within a data signal domain subsequent to this control signal domain, while the notification signal notifies that data is transmitted from a PLC modem which has transmitted the above-described control signal. Within a data signal domain after a notification signal is transmitted, a data signal is transmitted from the PLC modem which has transmitted the above-described notification signal by a plurality of data slots which uniquely correspond to at least this notification signal. The data slots which uniquely correspond to the notification signal contains a plurality of data slots among data slots which constitute each of control cycles, so that data from a PLC modem are transmitted without having a large interval within a data signal domain. As a consequence, while limits of delays in response to data which are tried to be transmitted by the respective communication apparatuses can be satisfied, data signals can be transmitted in a higher efficiency by avoiding collisions of data signals.

Figure 5:
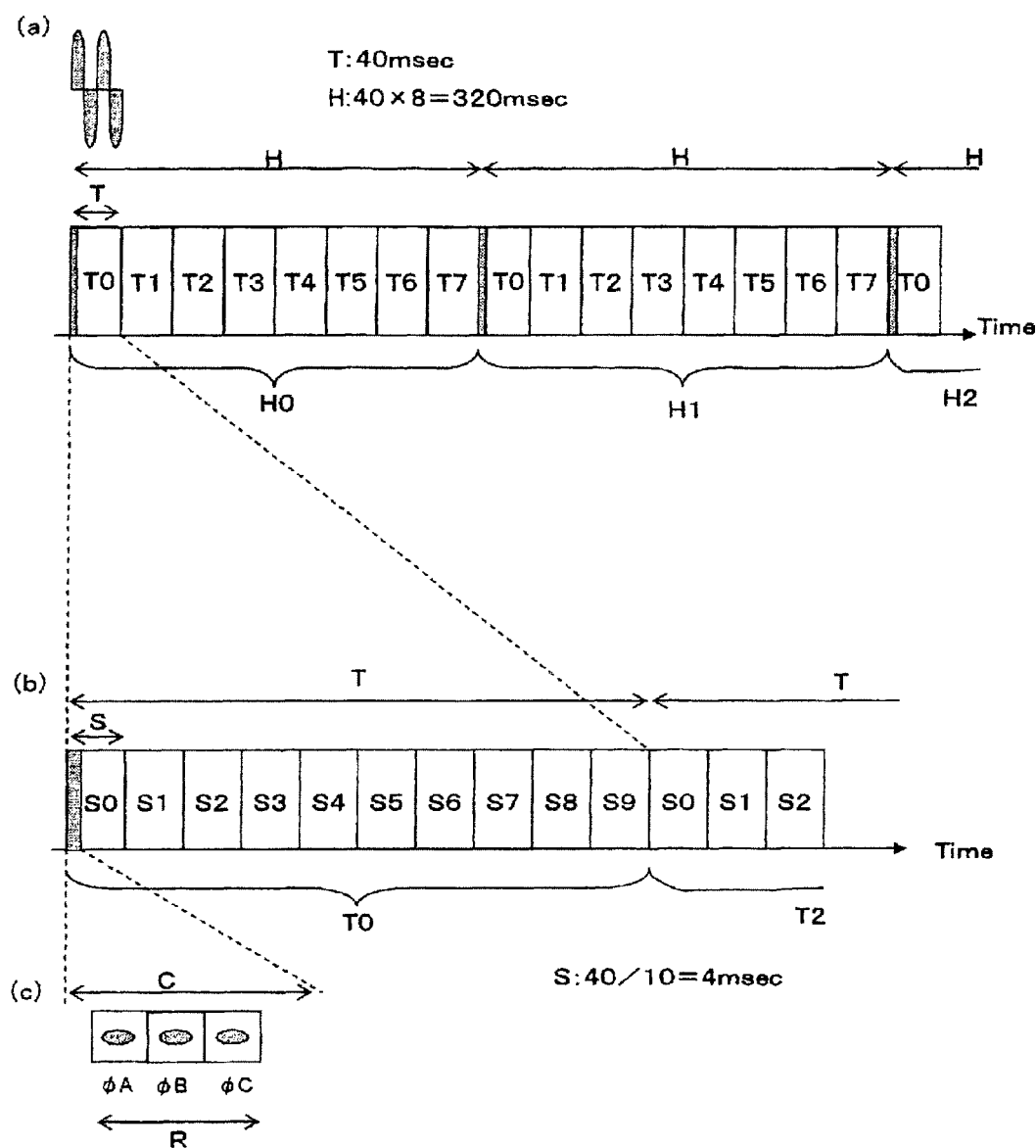
FIG. 5 is a diagram for showing one example as to a communication cycle in the power line communication system according to the embodiment of the present invention.

FIG. 5 represents one example of a communication cycle conducted in the power line communication system according to the embodiment of the present invention. A single communication cycle "H" is constituted by a plurality (namely, 8 pieces) of control cycles "T0" to "T7" (refer to (a) in FIG. 5), and each of control cycles "T" is constituted by a plurality (namely, 10 pieces) of data slots "S0" to "S9" (refer to (b) in FIG. 5). A head portion of the head data slot "S0" of the control cycle "T0" is secured as a control signal domain "C." As a result, this data slot "S0" is made slightly narrower, as compared with other data slots.

In the example of FIG. 5, a control cycle "T" corresponds to two time periods (namely, 40 msec in case of 50 Hz) of the power supply, and a communication cycle "H" corresponds to 40*8=320 msec. Also, a width of a single data slot corresponds to 40/10=4 msec.

The control signal domain "C" corresponds to a time domain which is provided at a head of a communication cycle "H", and contains at least a notification signal domain "R" during which the above-described notification signal is transmitted (refer to (c) in FIG. 5). In the example of (c) in FIG. 5, while the notification signal domain "R" contains three request slots, the respective request slots are provided in order to transmit a notification signal "φA" of the communication system "A", a notification signal "φB" of the communication system "B", and a notification signal "φC" of the communication system "C." A width of each of the request slots is, for example, 80 μsec. A guard time of 80 μsec is provided before and after each of the request slots. As a consequence, the notification signal domain "R" of FIG. 5 which has the three request slots is equal to 720 μsec as an entire time.

Figure 6A:
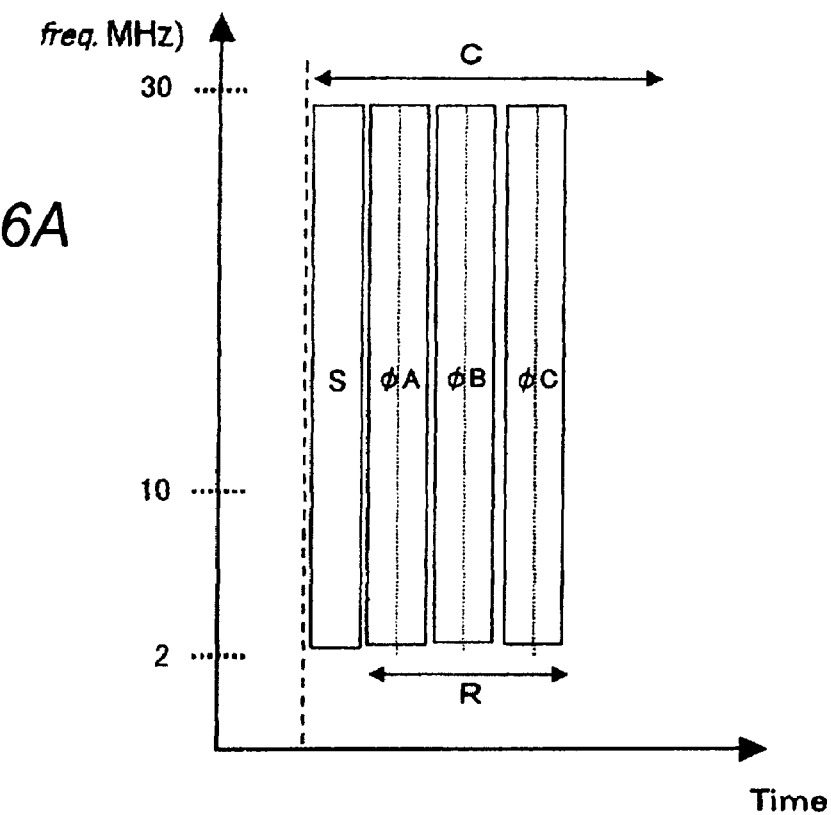
FIGS. 6A and 6B are diagrams for indicating examples as to a control signal domain in the power line communication system according to the embodiment of the present invention.
Figure 6B:
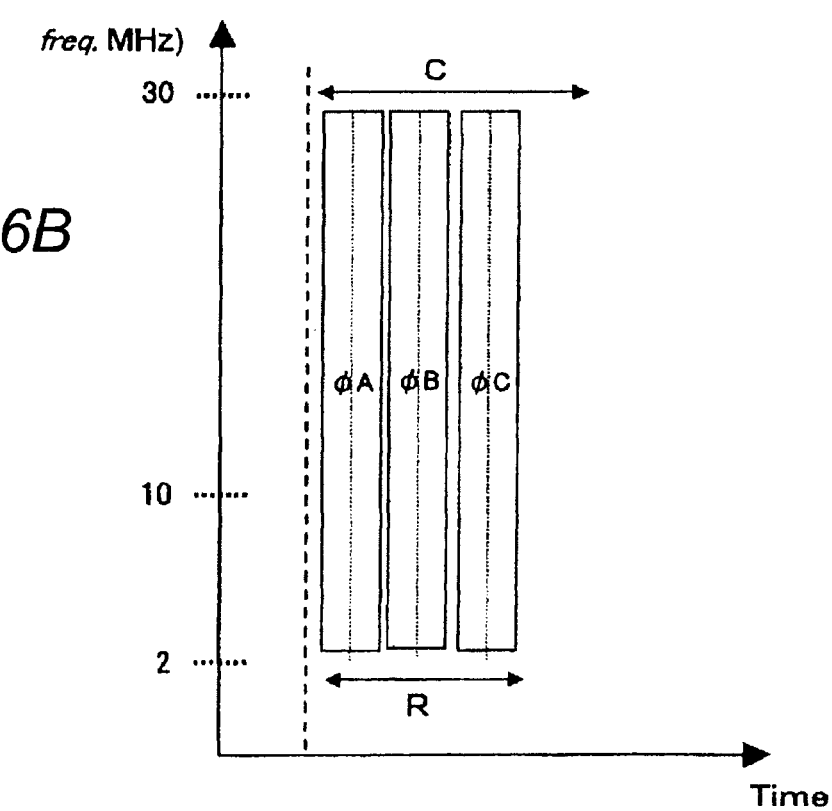

FIGS. 6A and 6B show detailed contents of the above-described control signal domain "C." As indicated in FIGS. 6A and 6B, a control signal is a multi-carrier signal which utilizes a plurality of sub-carriers having frequencies from 2 MHz to 30 MHz, and corresponds to such a signal that known data (for example, all of data are "1") are rotated by a predetermined phase vectors. A rotating process operation based upon a phase vector may be carried out by the PLC•PHY blocks of FIG. 3 and FIG. 4, for instance, as shown in the Patent Publication 1, so that descriptions thereof will be omitted. Also, as will be discussed later, a notification signal of the control signal domain "C" is utilized so as to determine a data transmission slot, and also, a detection of a control signal is also carried out by the PLC•PHY blocks. It should also be understood that in such a PLC modem (namely, PLC modems 100 of FIG. 3 and FIG. 4) equipped with a plurality of PLC•PHY blocks, a transmission of a control signal is carried out by one PLC•PHY block (namely, PLC•PHY block 11B2 shown in FIG. 3, and PLC•PHY block 42D indicated in FIG. 4). As represented in FIGS. 6A and 6B, in such a case that the notification signals corresponding to the different communication systems are transmitted by employing the respective different request slots, such notifications which are rotated by the respective different phase vectors may not be used.

FIG. 6A indicates an example having slots which are employed in order to transmit a synchronization signal "S" as a control signal, and also to transmit notification signals "φA", "φB", "φC" corresponding to the communication systems "A", "B", "C", respectively. FIG. 6B indicates another example having slots which are employed in order to transmit the notification signals, "φA", "φB", "φC", corresponding to the communication systems "A", "B", "C", without the synchronization signal "S." Alternatively, not only the control signal, the synchronization signal and the notification signals are transmitted, but also other control signals may be transmitted. Furthermore, with respect to the notification signals, not only the request slots for transmitting three sorts of the above-described notification signals "φA", "φB", "φC" are secured, but also other request slots for transmitting four sorts, or more sorts of notification signals may be alternatively secured.

Figure 7:
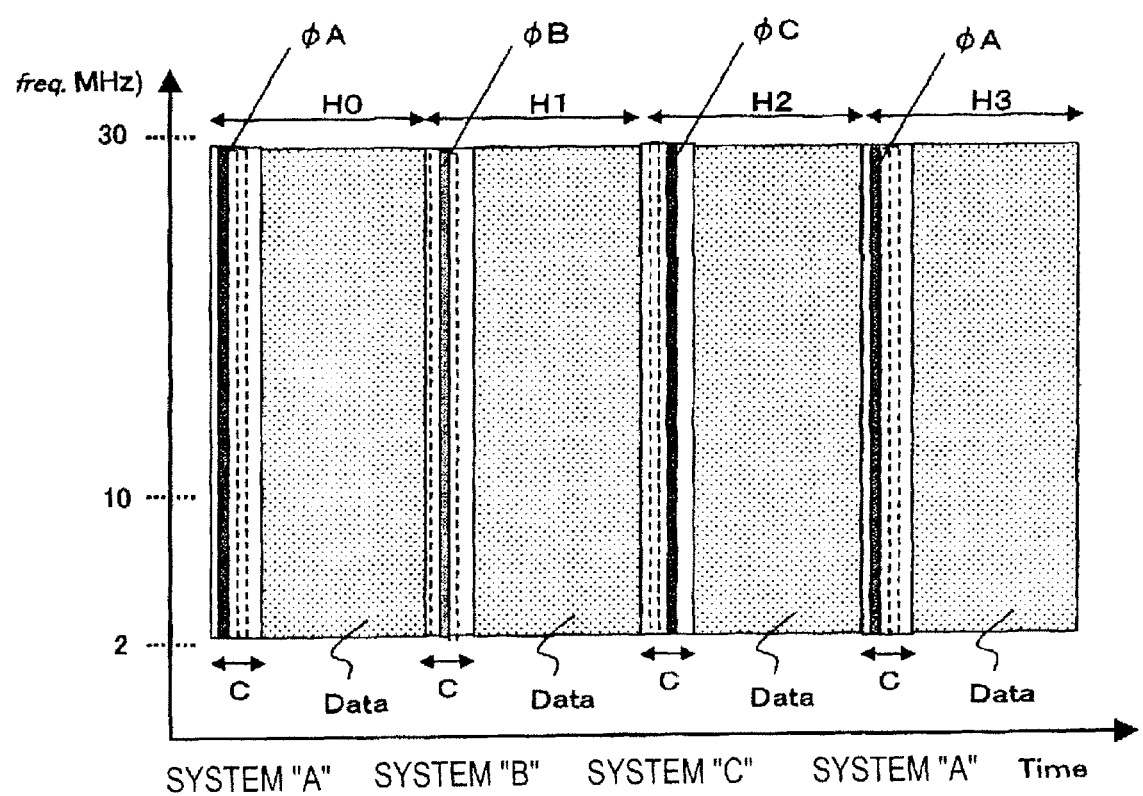
FIG. 7 is a diagram for indicating another example as to a control signal domain in the power line communication system according to the embodiment of the present invention.

FIG. 7 shows another example as to a control signal domain "C." In the example of FIG. 7, only a single notification signal can be transmitted within a single control domain "C." In other words, in communication cycles "H0" and "H3", the notification signal "φA" corresponding to the communication system "A" can be transmitted by request slots allocated thereto; in a communication cycle "H1", the notification signal "φB" corresponding to the communication system "B" can be transmitted by a request slot allocated thereto; and, in a communication cycle "H2", the notification signal "φC" corresponding to the communication system "C" can be transmitted by a request slot allocated thereto. When the above-described idea of the control signal domain "C" is employed, a decision for decide whether or not a notification signal is present can be made by merely detecting whether or not a single control signal is present within a single control signal domain. As a result, the process for detecting the notification signal can be simplified, and the arrangement of the communication apparatus can be made simple. It should be understood that, as indicated in FIG. 7, since the communication systems "A" to "C" with respect to the respective communication cycles "φA" to "φC" are allocated in a periodic manner, the detecting process for the notification signals can be simplified.

Figure 8:
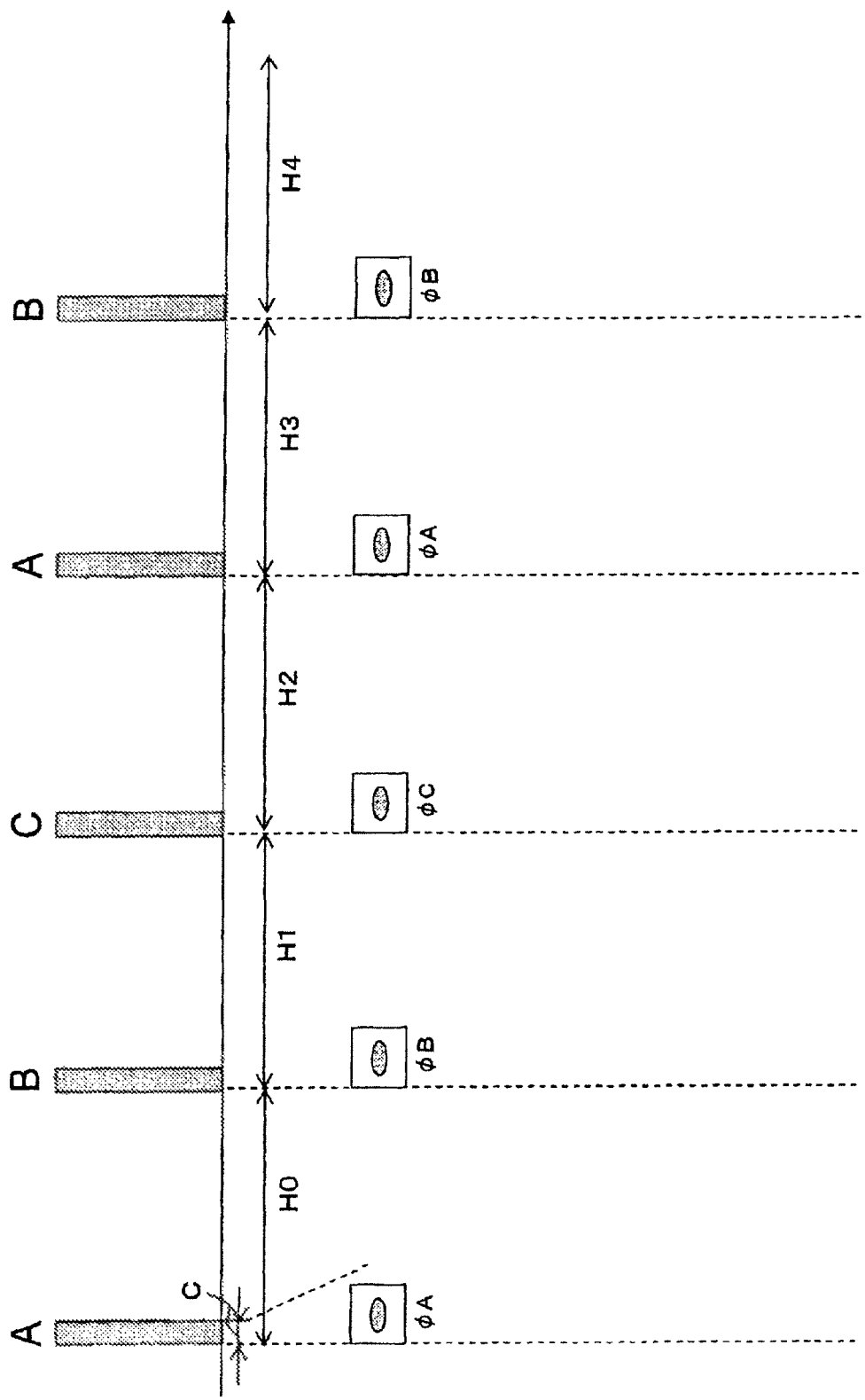
FIG. 8 is a diagram for indicating another example as to a control signal domain in the power line communication system according to the embodiment of the present invention.

FIG. 8 is another example as to notification signals within a control signal domain "C" (note that in FIG. 8 and succeeding drawings, only communication cycle "H0" is described). This example of FIG. 8 corresponds to such a case that there is one request slot for transmitting a notification signal corresponding to a communication system, and as to the respective notification signals, such notification signals are employed which are rotated by phase vectors different from each other. In other words, in communication cycles "H0" and "H3", the notification signal "φA" corresponding to the communication system "A" is transmitted; in communication cycles "H1" and "H4", the notification signal "φB" corresponding to the communication system "B" is transmitted; and in a communication cycle "H2", the notification signal "φC" corresponding to the communication system "C" is transmitted. When the above-described idea of the control signal domain "C" is employed, since only a single notification signal is transmitted within a single control signal domain, one corresponding phase vector is merely detected from a plurality of different phase vectors within a single control slot. As a result, the arrangement of the communication apparatus can be made simple. Also, a control domain can be made narrow, so that a communication efficiency can be improved. In the above case, since only one notification signal is contained in each request slot, low precision of the AC cycle detector 60 which is provided in the communication apparatus for receiving the notification signals "φA", "φB" and "φC", for detecting the zero-cross point of AC power waveform may be accepted. Accordingly, a low-cost AC cycle detector can be used in this case.

Figure 9:
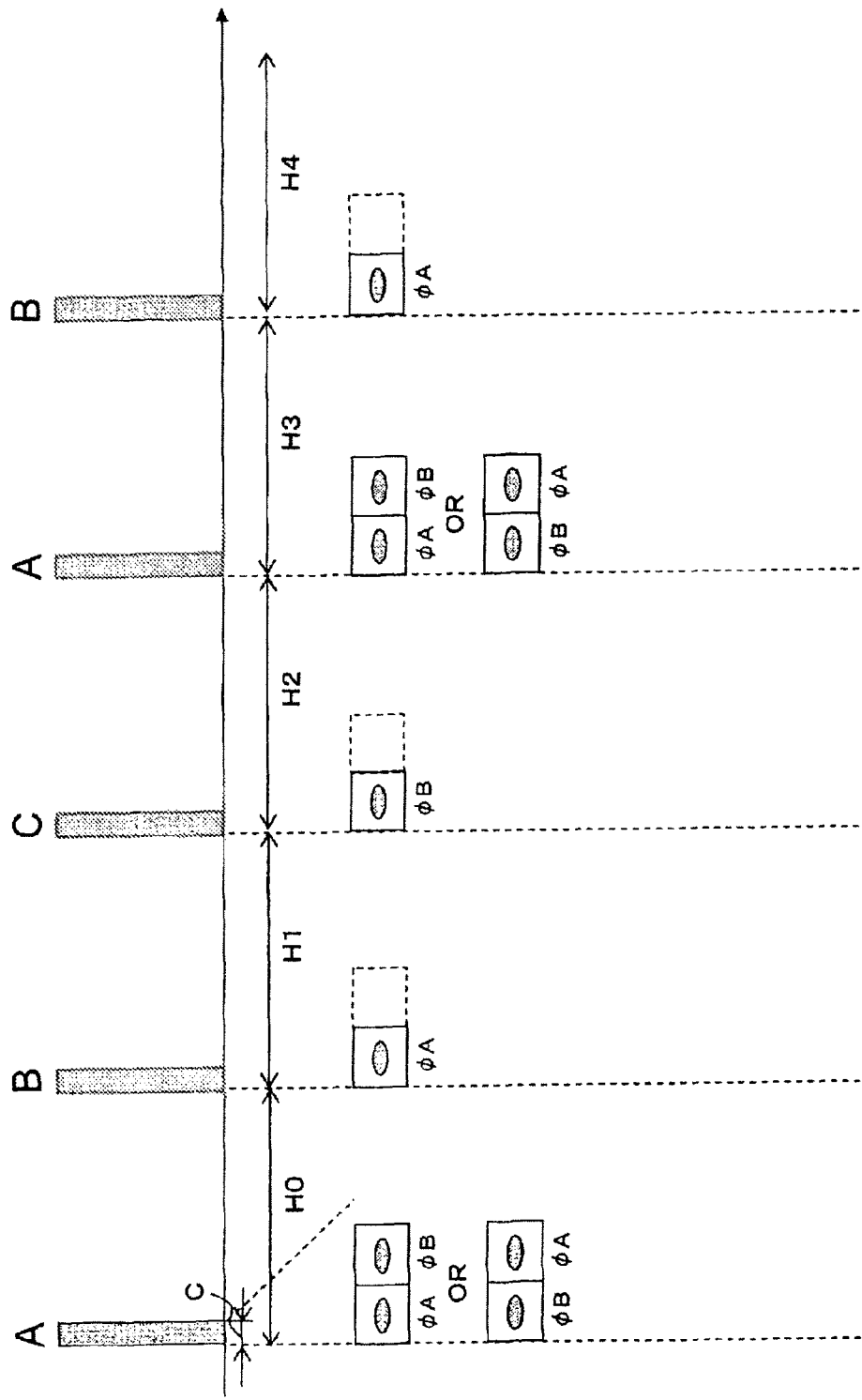
FIG. 9 is a diagram for indicating another example as to a control signal domain in the power line communication system according to the embodiment of the present invention.

FIG. 9 is another example as to notification signals within a control signal domain "C." That is, in the example of FIG. 9, two sets of request slots are provided which are employed in order to transmit notifications corresponding to three sorts of communication systems. In this example, as to notification signals "φA" and "φB", such notification signals are employed which are rotated by phase vectors different from each other. In other words, when both the notification signals "φA" and "φB" are transmitted, this communication system corresponds to the above-described communication system "A", whereas when only the notification signal "φA", or the notification signal "φB" is transmitted, this communication system corresponds to either the communication system "B" or the communication system "C." In such a case that both the notification signals "φA" and "φB" are transmitted, other communication systems may be alternatively set based upon a signal transmission order. For example, when the notification signals φA and φB are transmitted in this order, TDM of the communication system "A" may be set, whereas when the notification signals φB and φA are transmitted in this order, FDM of the communication system "A" may be set. With employment of this notification signal transmission method, even when transmission slots of notification signals are located adjacent to each other, the notification signals can be firmly detected, and the communication efficiency can be improved by narrowing the control signal domains. Also, the communication systems can be discriminated from each other by combining the plurality of notification signals with each other. As a result, the communication efficiency can be furthermore improved by narrowing the control signal domain.

Figure 10:
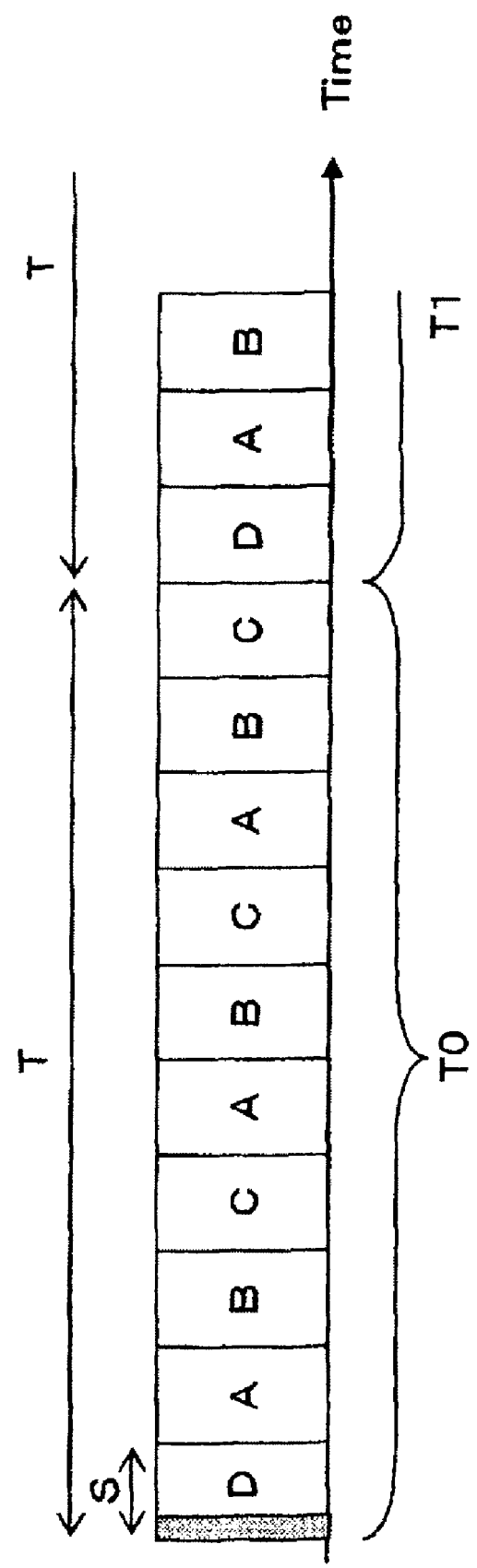
FIG. 10 is a diagram for showing one example as to an allocation of data slots in the power line communication system according to the embodiment of the present invention.

Next, a description is made of such an allocation example that data slots are allocated within a data signal domain after a notification signal is transmitted. FIG. 10 is a diagram for representing one example as to an allocation of data slots. In the example of FIG. 10, such a data slot allocation is performed that the PLC modems which utilize three sorts of the communication systems (communication systems A, B, C) as shown in FIG. 1 are connected to a power line, and furthermore, such a PLC modem (not shown in FIG. 1) which utilizes a communication system (communication system D) having a low priority performs a communication operation at the same time when the first-mentioned PLC modems perform communication operations. As shown in FIG. 10, in all of control cycles "T" within a single communication cycle "H", the same data slots are allocated. If these data slots are allocated, then while limits of delays in correspondence with data which are tried to be transmitted by respective communication apparatuses connected to the common transmission channel can be satisfied, collisions of signals can be avoided, so that data can be transmitted in a high efficiency.

Figure 11:
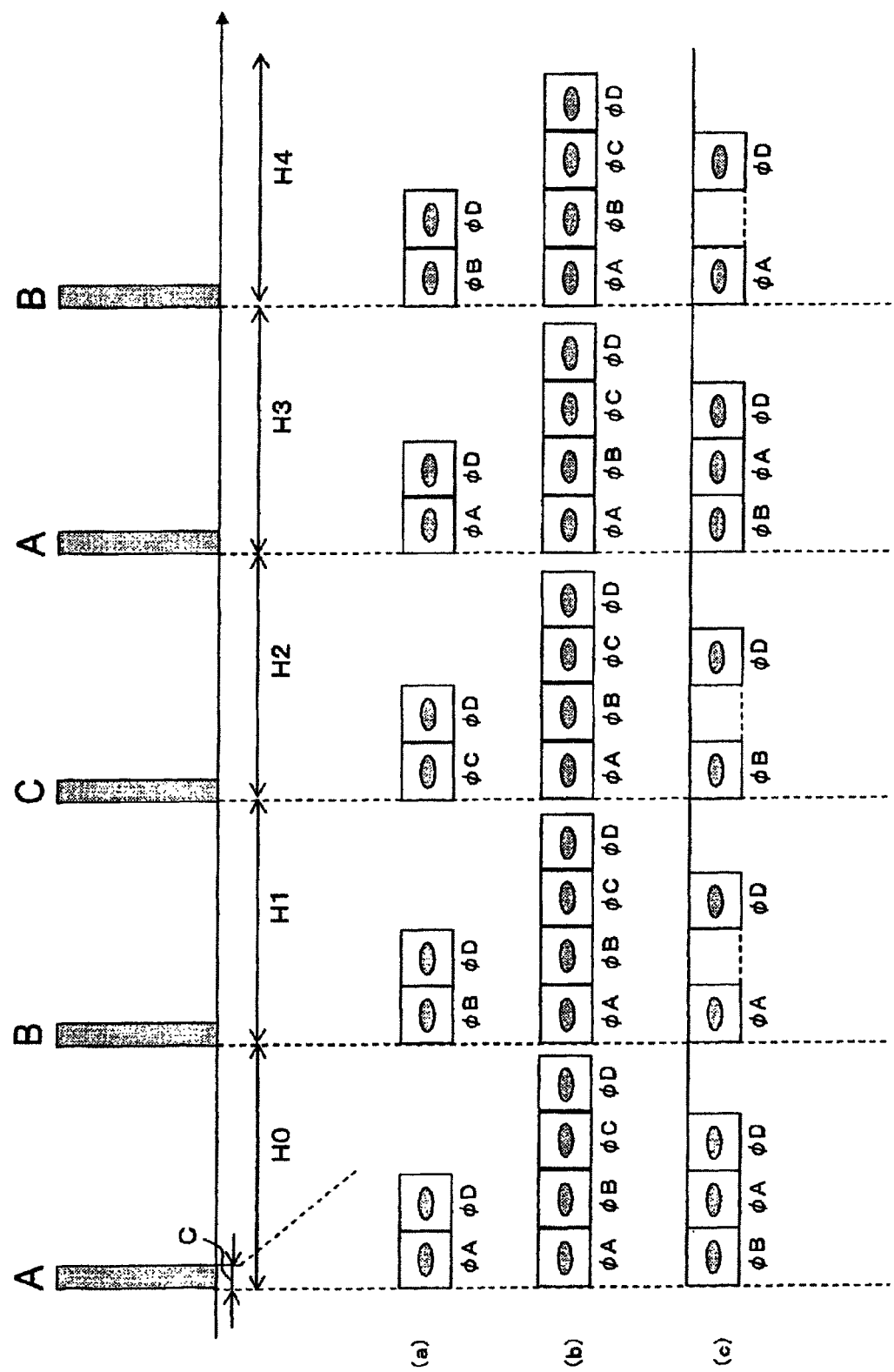
FIG. 11 is a diagram for representing one example as to notification signals in the power line communication system according to the embodiment of the present invention.

FIG. 10 is such an exemplification that the data slots are allocated under such a status that four sorts of notification signals are transmitted. Alternatively, the notification signals may be transmitted within control signal domains of the respective allocated communication cycles, or may be transmitted within the same control signal domain. FIG. 11 indicates an example as to statues of these notification signals. (a) in FIG. 11 shows an example in such a case that the notification signals are utilized in communication cycles to which three sorts of the communication systems (namely, communication systems, "A", "B", "C") are allocated, and a communication system (communication system "D") having a low priority is present. In each of the communication cycles "H", the notification signal of the communication system (communication system "D") having the low priority is transmitted after the notification signals of the communication systems "A", "B", "C", respectively. Also, (b) in FIG. 11 shows another example in such a case that the notification signals are transmitted within a control domain in which three sorts of the communication systems (namely, communication systems "A", "B", "C") are identical to each other, a communication system (communication system "D") having a low priority is present. In each of the communication cycles "H", the notification signal of the communication system (communication system "D") having the low priority is transmitted after the notification signals of the communication systems "A", "B", "C". Similar to (a) in FIG. 11, (c) in FIG. 11 shows an example in such a case that the notification signals are utilized in communication cycles to which three sorts of the communication systems (namely, communication systems "A", "B", "C") are allocated, and a communication system (communication system "D") having a low priority is present. However, (c) in FIG. 11 shows such a case that the notification signals of the communication systems "A", "B", and "C" are transmitted in accordance with the method represented in FIG. 9. In each of the communication cycles "H", the notification signals of the communication systems A, B, C are transmitted in accordance with the method shown in FIG. 9 before the notification signal of the communication system (communication system "D") having the low priority. Also, with respect to the communication system (communication system "D") having the low priority, the notification signal may not always be transmitted within all of the control domains where the notification signal can be transmitted. It should also be noted that in this case, an interval of transmission signals of the communication systems "D" must be previously determined. For example, as the predetermined time interval, a notification signal of the communication system "D" must be transmitted one time within three control domains.

Figure 12:
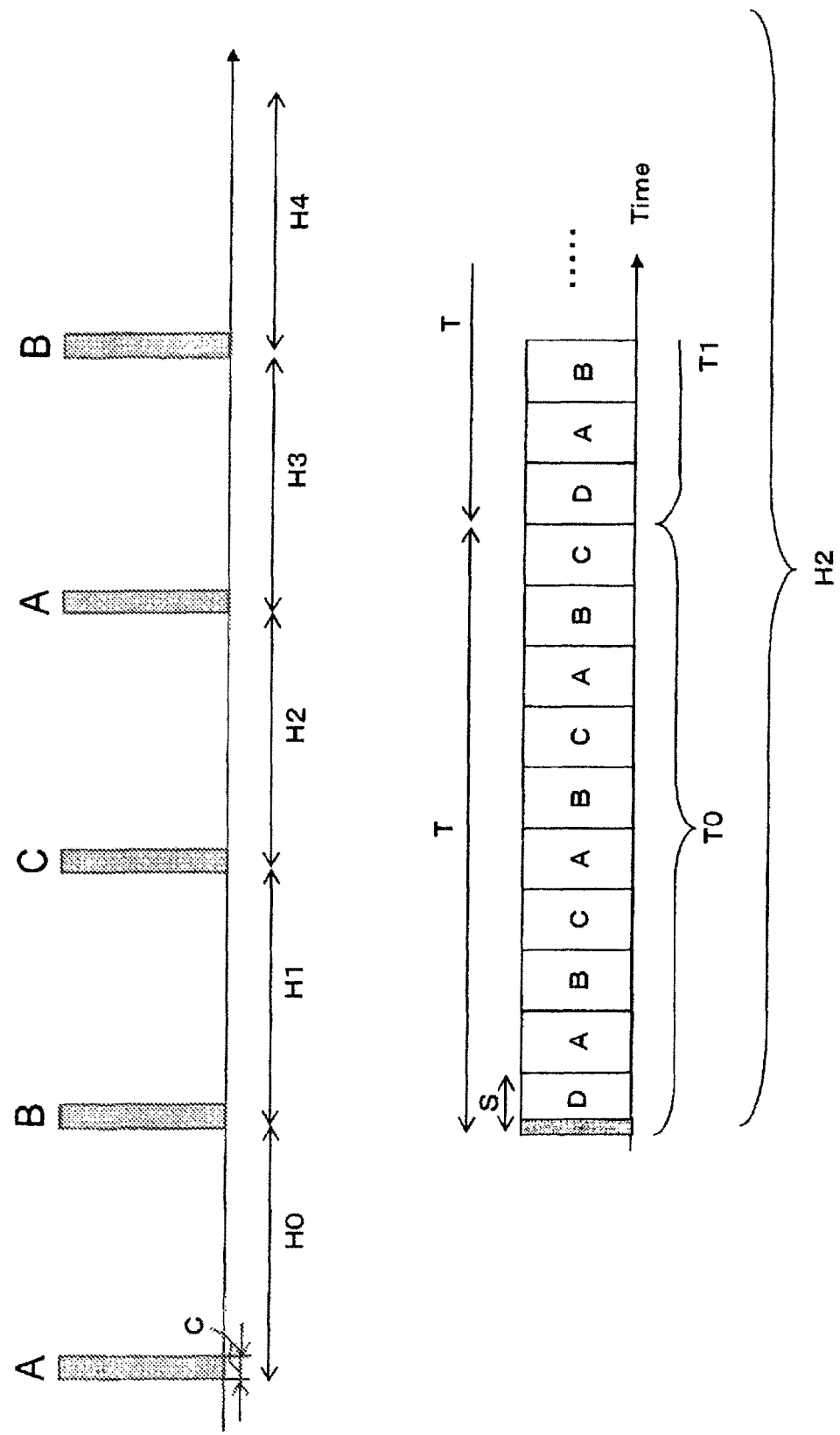
FIG. 12 is a diagram for showing one example as to notification signals and data slots in the power supply communication system according to the embodiment of the present invention.

FIG. 12 indicates data slots in the case that notification signals "φA", "φB", "φC", which correspond to the respective communication systems "A", "B", "C" are transmitted within a control signal domain "C" of each allocated communication cycle "H." It is so assumed that the notification signals corresponding to the communication system "D" are transmitted in all of the communication cycles, as shown in FIG. (a), (b) or (c) in 11. As represented in FIG. 12, when a notification signal can be transmitted within an allocated communication cycle, such a notification signal corresponding to one communication system is effective until a communication cycle during which the same notification signal can be transmitted at the next time. In other words, within communication cycles subsequent to at least the communication cycle "H2", notification signals corresponding to the communication systems "A", "B", "C", "D" are effective. As a result, similar to FIG. 10, the data slots are allocated to the communication systems "A", "B", "C", and "D."

Figure 13:
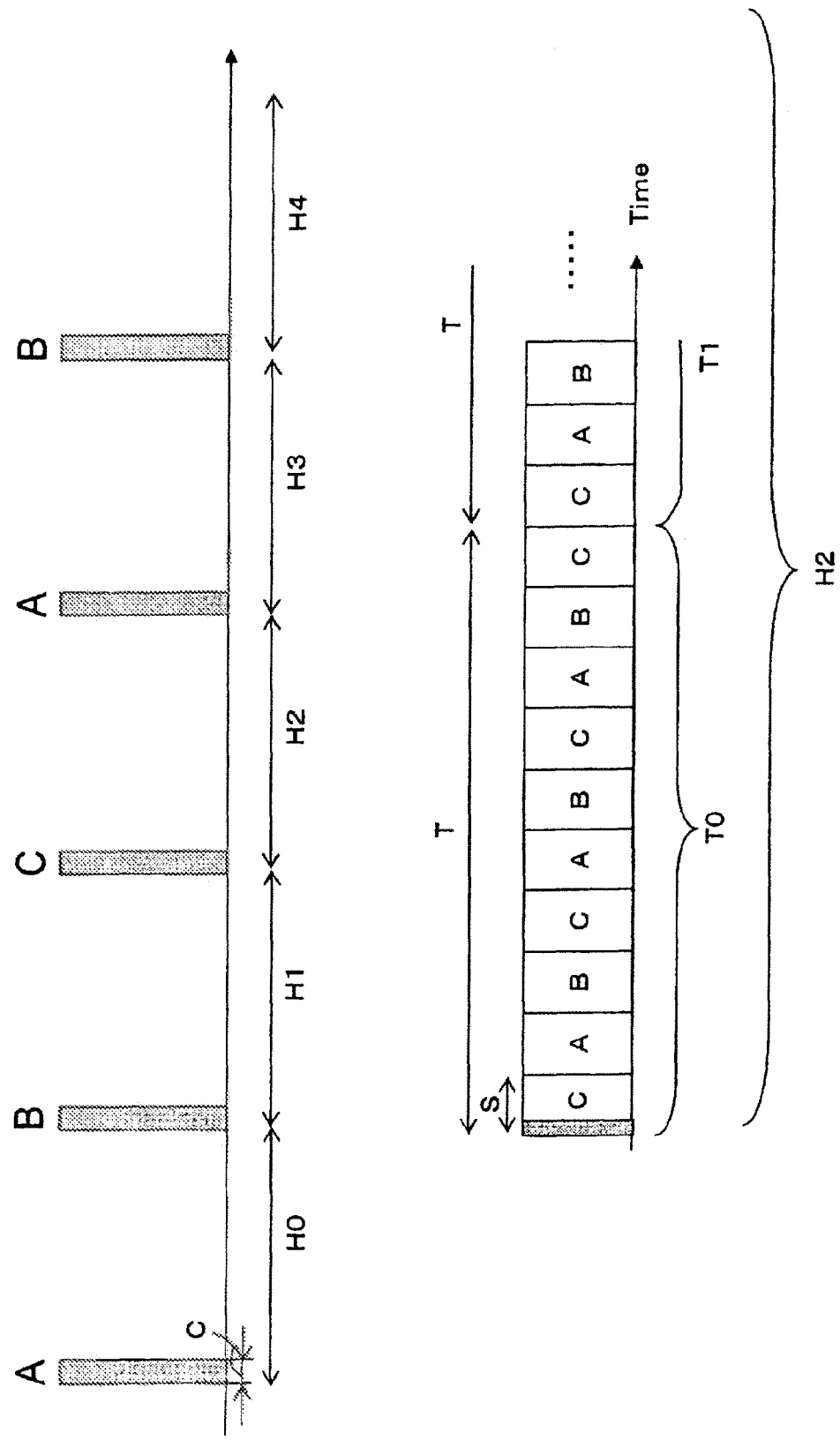
FIG. 13 is a diagram for showing another example as to notification signals and data slots in the power supply communication system according to the embodiment of the present invention.

FIG. 13 is a diagram for indicating data slots under the same condition as that of FIG. 11 except that notification signals corresponding to the notification system "D" are not transmitted. As apparent from FIG. 13, slots from the data slot "S1" up to the data slot "S9" are allocated to the communication systems "A", "B", "C" in a periodic manner. On the other hand, a slot "S0" is allocated to a communication system corresponding to such a notification signal which is transmitted immediately before this slot "S0." That is, within a data domain of a communication cycle "H2" of FIG. 13, the communication system "C" corresponding to the notification which was transmitted immediately before the slot "S0" is allocated to this slot "S0." Since the above-described slot allocating method is employed, the respective communication systems "A" to "D" can use the slot "S0" at the same ratio.

Figure 14:
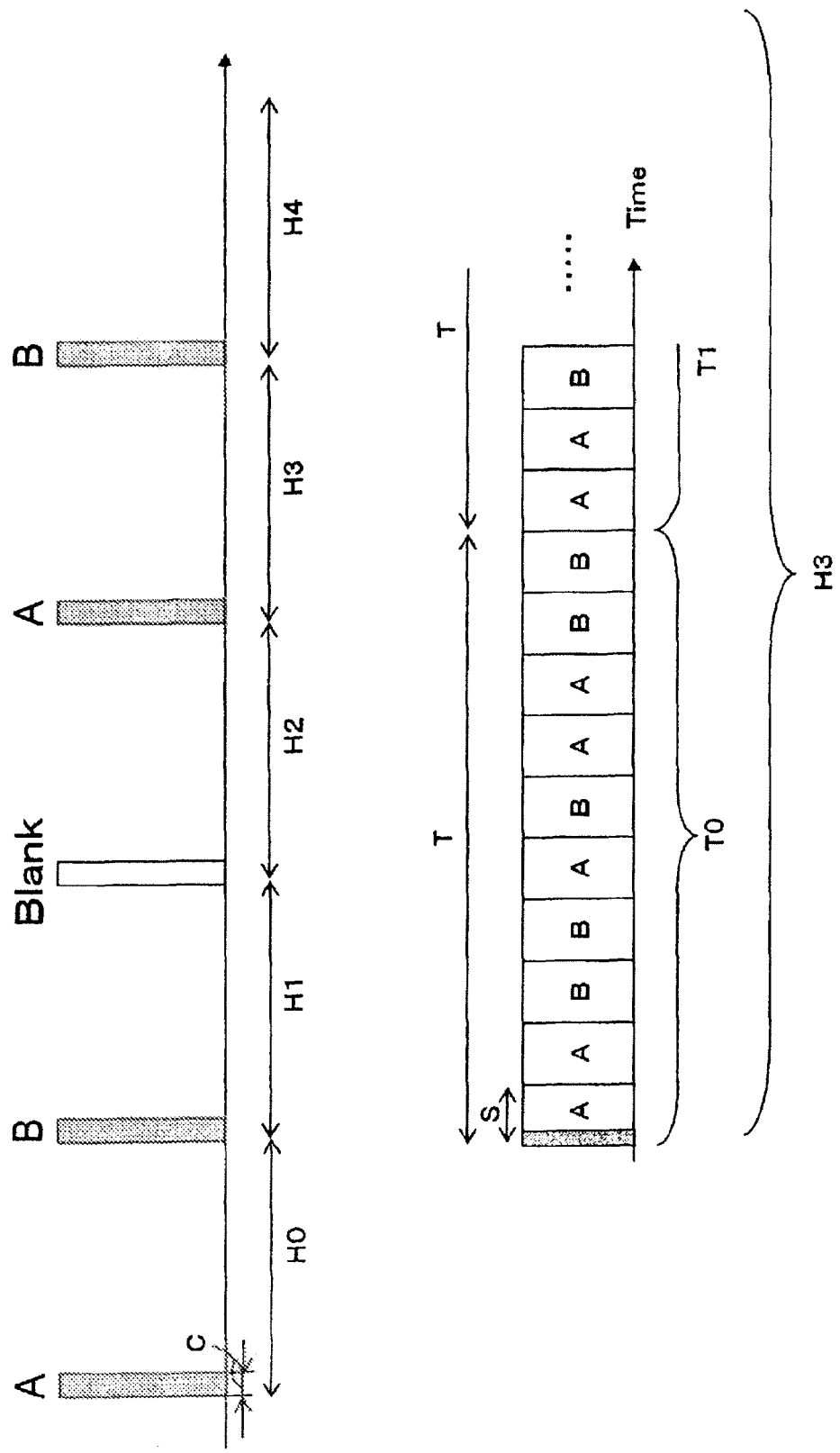
FIG. 14 is a diagram for showing another example as to notification signals and data slots in the power supply communication system according to the embodiment of the present invention.

FIG. 14 shows another example of data slots. The example of FIG. 14 indicates structures of data slots in such a case that a notification signal corresponding to the communication system "C" has not been transmitted within a control signal domain allocated to the communication system "C", namely, in the case that the notification signal has not be transmitted within a control signal domain of a communication cycle "H2" allocated to the communication system "C." In this case, a communication system which is allocated to the data slots S1, S2, S4, S5, S7, and S8 is the communication system "A" or the communication system "B." The communication systems "A" and "B" are alternately allocated to the remaining data slots S0, S3, S6, and S9. It should also be noted that the communication systems are not always allocated to the data slots in the above-described alternate manner, but may be previously determined by considering system latency, and the like.

Figure 15:
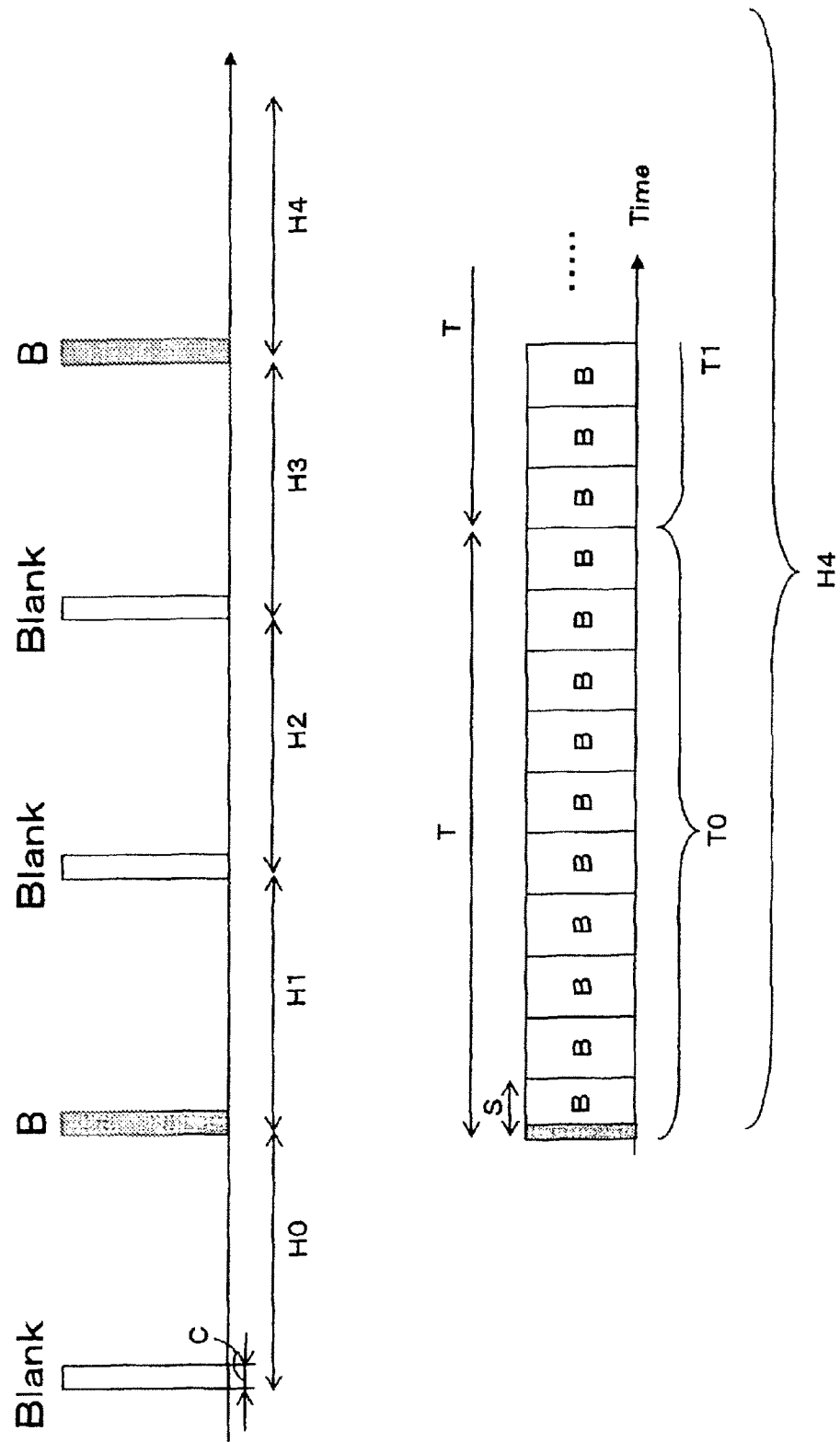
FIG. 15 is a diagram for showing another example as to notification signals and data slots in the power supply communication system according to the embodiment of the present invention.

FIG. 15 shows another example of data slots. FIG. 15 represents such a case that only notifies signals corresponding to the communication system "B" are transmitted. In this case, all of the data slots are allocated to this communication system "B."

As previously described, in such a case that a notification signal corresponding to a specific notification system is present, data slots to be allocated in responding to this notification signal contain such data slots which are previously and uniquely allocated to the respective communication systems. For instance, in the case that a notification signal of the communication system "A" is transmitted, the data slots to be allocated thereto contains the data slots S1, S4, S7, which are uniquely allocated to the communication system "A". Also, in the case that a notification signal of the communication system "B" is transmitted, the data slots to be allocated thereto have contained the data slots S2, S5, S8, which are uniquely allocated to the communication system "B". Furthermore, in the case that a notification signal of the communication system "C" is transmitted, the data slots to be allocated thereto have contained the data slots S3, S6, S9, which are uniquely allocated to the communication system "C". Then, such data slots allocated to such communication systems whose notification signals have not be transmitted are properly allocated to other communication systems whose notification signals are transmitted. FIG. 16 is a table for indicating notification signals which are present (are transmitted) in a transmission channel, and communication systems which are allocated to data slots of a control cycle "T." While such a table is previously stored in the PLC modem 10, a data slot capable of transmitting data is determined based upon a notification signal present in the transmission channel, and then, the data is transmitted by using this determined data slot. For instance, when the own communication system is the communication system "A", while the PLC modem 10 has previously stored thereinto a binary table shown in FIG. 17, the PLC modem 10 may transmit data by employing a data slot indicative of "1" in accordance with statuses of other existing systems. Alternatively, while the PLC modem 10 has previously prepared all of binary tables corresponding to the communication systems "A", "B", "C", the PLC modem 10 may switch these binary tables in correspondence with a sequence connected to the transmission channel. For example, in such a case that another single communication system has already been connected to the transmission channel at the time when the own communication system is connected to the transmission channel, the communication system already connected to the transmission channel is the communication system "A"; the own communication system is the communication system "B"; and the communication system which will be thereafter connected is the communication system "C."

It should also be noted that while the present system is not restricted only to a total number of these communication systems, the tables are constructed in accordance with the above-described example in conjunction with the number of communication systems, so that a similar effect may be expected. For example, in such a case that the major communication system is constructed of two systems (namely, communication systems "A" and "B"), it is sufficient to realize such a data slot allocation table as shown in FIG. 18.

Figure 19:
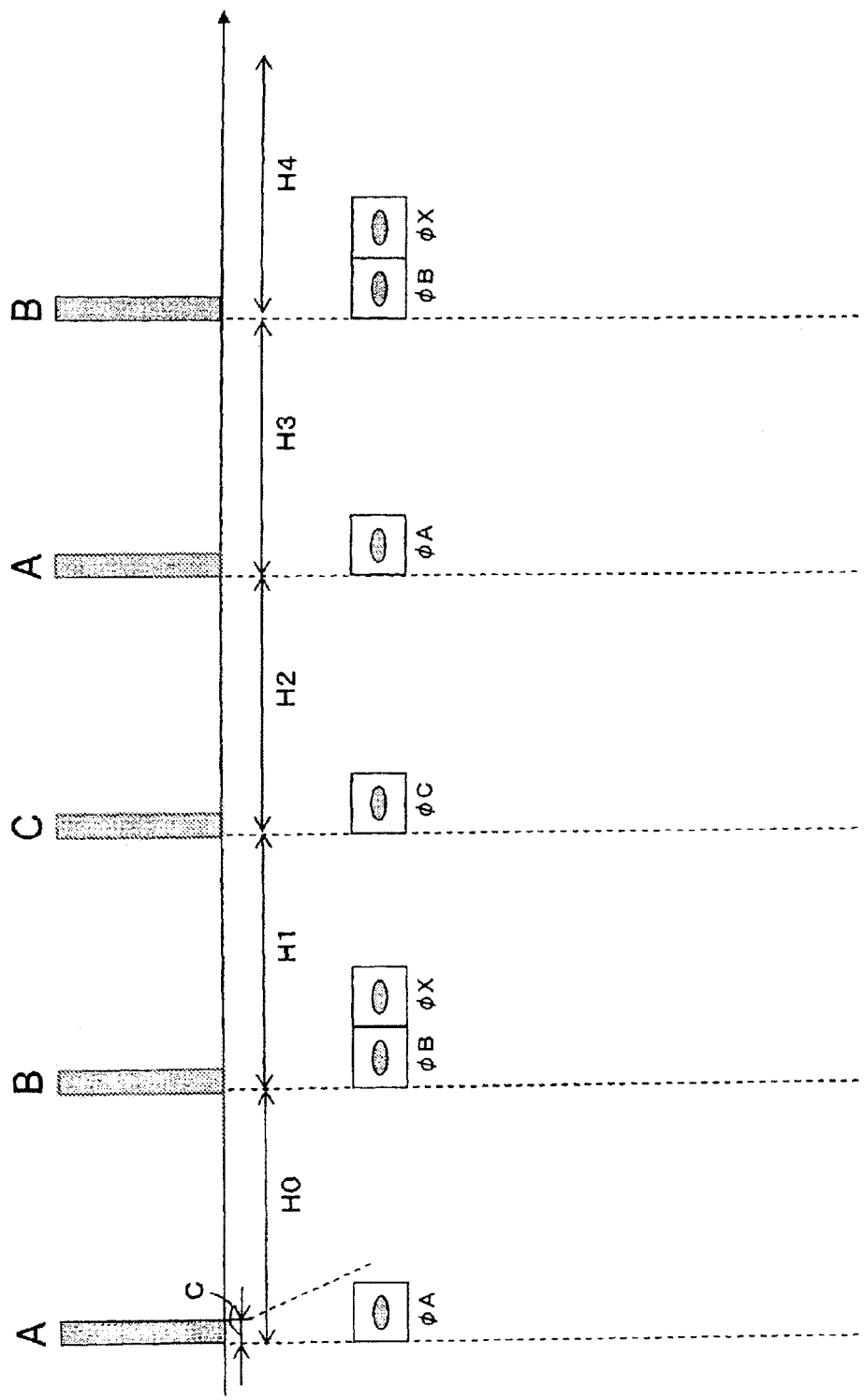
FIG. 19 is a diagram for showing another example as to notification signals and data slots in the power supply communication system according to another embodiment of the present invention.

As another embodiment of the present invention, a description is made of such a case that each of communication systems holds a plurality of tables with reference to FIG. 19 and FIG. 20. Although only one table was held in the above-described embodiment, in the present embodiment, while each of the communication systems holds a plurality of tables, a description is made how to update the tables by using either table updating slots or different phase vectors in response to a total number of these tables.

In the present embodiment, a slot "X" is added by considering two tables (alternatively, phase vector may be added in order to share other slots). Such a case that the respective communication systems alternately transmit notification signals will now be considered. At this time, as represented in FIG. 19, since a notification signal "φX" is transmitted in a slot "X" within the same control domain as such a control domain during which each of the communication systems transmits a notification signal, such an event that a table to be used is updated (namely, presently used table is switched to another table) is notified to another communication system. In other words, in FIG. 19, the communication system "B" transmits the notification signal "φX" in the slot "X" of the same control domain as the control domain for the own notification. In this case, while the communication systems "A", "B", "C" are present, approximately 3.3 pieces of slots are normally allocated to the communication system "B" ("3.3 pieces" is calculated by that, among 10 pieces of data slots, 3 slots are continuously secured, and S0 slot is secured only 1 time within 3 times of communication cycle "H"). However, in FIG. 19, since the notification signal is transmitted in the slot "X", it is so assumed that such a fact that, for example, only 2 pieces of slots are used without utilizing approximately 3.3 pieces of slots is notified. As previously explained, a slot is provided within the same control domain as the control domain for the notification signal, and then, another notification signal (namely, notification signal "φX" in FIG. 19) is transmitted within the provided slot. As a result, a variation may be made in the method for taking the fixed slots (namely, table to be utilized). In other words, since the above-described control operation is carried out, each of the communication systems can hold the plurality of tables, and the respective communication systems can utilize the plurality of tables while switching these plural tables.

FIG. 20 is one example as to a slot allocation table, namely indicates such a table which is utilized when the communication system "B" has transmitted signals within the same control domains (in this example, it is so assumed that communication system "B" has two tables shown in FIG. 16 and above example). Although tables are actually present in other communication systems, changed tables are described as to only the communication system "B" as a typical example. As indicated in FIG. 20, the communication system "B" uses only two pieces of slots (namely, slots "S2" and "S8"). Since such a control operation is carried out, it is possible to utilize such a table which is different from the table of FIG. 16. It should also be noted that the table of FIG. 20 is not fixed, but is merely one example, and therefore, may be arbitrarily set. In other words, in the table shown in FIG. 20, as compared with the table of FIG. 16, the slots which the system "B" can utilize are deleted. However, a plurality of completely different tables (namely, tables having different meanings) may be formed, and these completely different tables may be switched in response to a control signal. As only the use condition with respect to the present invention, the same tables are held in all of the communication systems, and the same table is utilized by the respective communication apparatuses in accordance with the signal of the control domain.

Although the above-described embodiments have exemplified such a case that the respective communication systems alternately transmits the notification signals, other notification signal transmitting methods may be similarly employed by employing the table updating slot. Also, a plurality of table updating slots may be provided, and therefore a plurality of tables can be constructed.

As previously described, when the PLC modem 10 connected to the power line 1A transmits the data, the PLC modem 10 transmits the control signal, receives the control signal, transmits the data signal, and receives the data signal. These process operations are mainly carried out by the main IC 11.

Even when plural sorts of communication apparatuses whose communication systems are different from each other are connected to the shared transmission channel, the present invention is usefully employed as a communication method, a communication apparatus, a communication system, and the like, which can perform the following process operations: That is, while limits of delays in response to data which are tried to be transmitted by the respective communication apparatuses can be satisfied, signals can be transmitted in a higher efficiency by avoiding collisions of signals. Also, the present invention is useful as such a communication method, a communication apparatus, a communication system, and the like, which are capable of reducing processing workloads for allocating the slots executed by the communication apparatus in order to avoid the collisions of the signals.

This application is based upon and claims the benefit of priority of Japanese Patent Application No. 2007-266950 filed on Oct. 12, 2007, the contents of which are incorporated herein by reference in its entirety.

What is claimed is:

1. A communication apparatus for communicating based on a first communication system, via a transmission channel to which a first other communication apparatus communicating based on the first communication system, second other communication apparatuses communicating based on a second communication system, and third other communication apparatuses communicating based on a third communication system are connected, wherein a data transmission domain and a notification domain for notifying a data transmission within the data transmission domain are allocated to the communication apparatus and the first other communication apparatus, the second other communication apparatuses, and the third other communication apparatuses, respectively, the communication apparatus, comprising:
a detector which detects a notice transmitted from the first, second and third other communication apparatuses within the notification domain;
a transmitter which transmits a notice for the data transmission within the notification domain; and
a controller which reallocates the data transmission domain in accordance with the notice transmitted from the first, second and third other communication apparatuses and the notice transmitted from the transmitter.

2. The communication apparatus according to claim 1, wherein the notification domain includes a first notification domain allocated to the communication apparatus and the first other communication apparatus, a second notification domain allocated to the second other communication apparatuses, and a third notification domain allocated to the third other communication apparatuses.

3. The communication apparatus according to claim 1,
wherein the notification domain is a domain common to the communication apparatus and the first, second and third other communication apparatuses,
wherein the communication apparatus transmits the notice by a first notification signal within the notification domain, and
wherein the communication apparatus detects the notice from the first other communication apparatus, the notice from the second other communication apparatuses, the notice from the third other communication apparatuses, which are different from each other.

4. The communication apparatus according to claim 3,
wherein a notification signal from the communication apparatus or the first other communication apparatus is transmitted using a combined notification signal including plural notification signals within the notification domain, and
wherein notification signals from the second and third other communication apparatuses are received in form of a combined notification signal including plural notification signals within the notification domain.

5. The communication apparatus according to claim 1, wherein the controller reallocates the data transmission domain in a predetermined allocation order in accordance with the notice from the second other communication apparatuses, the notice from the third other communication apparatuses, and transmission of the notice from the communication apparatus or the notice from the first other communication apparatuses.

6. The communication apparatus according to claim 1, wherein in case that the notice of the communication apparatus is transmitted, and the notice from the second other communication apparatuses is detected, while the notice from the third other communication apparatuses is not detected, the controller reallocates the data transmission domain for the third other communication apparatuses to the communication apparatus and the first other communication apparatus, and the second other communication apparatuses.

7. The communication apparatus according to claim 5, further comprising a memory for previously storing the allocation order of the data transmission domain for the communication apparatus in correspondence with the transmission of the notice of the communication apparatus or the notice from the first other communication apparatuses, the notice from the second other communication apparatuses, and the notice from the third other communication apparatuses,
wherein the controller reallocates the data transmission domain in accordance with allocation of the data transmission domain to the communication apparatus, stored in the memory.

8. The communication apparatus according to claim 1, wherein the notification domain is periodically allocated to the first communication system, the second communication system, and the third communication system.

9. The communication apparatus according to claim 8, wherein the controller allocates the data transmission domain in accordance with a detection of the notice from the second other communication apparatuses, a detection of the notice from the third other communication apparatuses and transmission of the notice of the communication apparatus, during a plurality of the data transmission domains from which the communication apparatus transmits the notice for the data transmission until which the communication apparatus transmits a following notice for the data transmission.

10. A communication method of a communication apparatus for communicating based on a first communication system, via a transmission channel to which a first other communication apparatus communicating based on the first communication system, second other communication apparatuses communicating based on a second communication system, and third other communication apparatuses communicating based on a third communication system are connected, wherein a data transmission domain and a notification domain for notifying a data transmission within the data transmission domain are allocated to the communication apparatus and the first other communication apparatus, the second other communication apparatuses, and the third other communication apparatuses, respectively,
the communication method, comprising:
detecting a notice transmitted from the first, second and third other communication apparatuses within the notification domain;
transmitting a notice for the data transmission within the notification domain; and
reallocating the data transmission domain in accordance with the notice transmitted from the first, second and third other communication apparatuses and the notice transmitted from the transmitter.

11. The communication method according to claim 10, wherein the notification domain includes a first notification domain allocated to the communication apparatus and the first other communication apparatus, a second notification domain allocated to the second other communication apparatuses, and a third notification domain allocated to the third other communication apparatuses.

12. The communication method according to claim 10,
wherein the notification domain is a domain common to the communication apparatus and the first, second and third other communication apparatuses,
wherein the notice is transmitted using a first notification signal by the communication apparatus within the notification domain, and
wherein the notice from the first other communication apparatus, the notice from the second other communication apparatuses, the notice from the third other communication apparatuses, which are different from each other, are detected.

13. The communication method according to claim 12,
wherein a notification signal from the communication apparatus and the first other communication apparatus is transmitted using a combined notification signal including plural notification signals with in the notification domain, and
wherein notification signals from the second and third other communication apparatuses are received in form of a combined notification signal including plural notification signals with in the notification domain.

14. The communication method according to claim 10, wherein in reallocating process, the data transmission domain is reallocated in a predetermined allocation order in accordance with the notice from the second other communication apparatuses, the notice from the third other communication apparatuses, and transmission of the notice of the communication apparatus or the notice from the first other communication apparatuses.

15. The communication method according to claim 10, wherein in case that the notice of the communication apparatus is transmitted, and the notice from the second other communication apparatuses is detected, while the notice from the third other communication apparatuses is not detected, the data transmission domain for the third other communication apparatuses is reallocated to the communication apparatus and the first other communication apparatus, and the second other communication apparatus in the reallocating process.

16. The communication method according to claim 10, wherein the notification domain is periodically allocated to the first communication system, the second communication system, and the third communication system.

17. The communication method according to claim 14, wherein the data transmission domain is allocated in accordance with a detection of the notice from the second other communication apparatuses, a detection of the notice from the third other communication apparatuses and transmission of the notice of the communication apparatus, during a plurality of the data transmission domains from which the communication apparatus transmits the notice for the data transmission until which the communication apparatus transmits a following notice for the data transmission.

18. A circuit module of a communication apparatus for communicating based on a first communication system, via a transmission channel to which a first other communication apparatus communicating based on the first communication system, second other communication apparatuses communicating based on a second communication system, and third other communication apparatuses communicating based on a third communication system are connected, wherein a data transmission domain and a notification domain for notifying a data transmission within the data transmission domain are allocated to the communication apparatus and the first other communication apparatus, the second other communication apparatuses, and the third other communication apparatuses, respectively, the circuit module, comprising:
a coupler for interfacing with the transmission channel;
a detector which detects a notice transmitted from the first, second and third other communication apparatuses within the notification domain via the coupler;
a transmitter which transmits a notice for the circuit module within the notification domain; and
a controller which reallocates the data transmission domain in accordance with the notice transmitted from the first, second and third other communication apparatuses and the notice transmitted from the transmitter.

19. An integrated circuit of a communication apparatus for communicating based on a first communication system, via a transmission channel to which a first other communication apparatus communicating based on the first communication system, second other communication apparatuses communicating based on a second communication system, and third other communication apparatuses communicating based on a third communication system are connected, wherein a data transmission domain and a notification domain for notifying a data transmission within the data transmission domain are allocated to the communication apparatus and the first other communication apparatus, the second other communication apparatuses, and the third other communication apparatuses, respectively, the integrated circuit, comprising:
a detector which detects a notice transmitted from the first, second and third other communication apparatuses within the notification domain via a coupler for interfacing with the transmission channel;
a transmitter which transmits a notice for the data transmission within the notification domain via the coupler; and
a controller which reallocates the data transmission domain in accordance with the notice transmitted from the first, second and third other communication apparatuses and the notice transmitted from the transmitter.

20. A communication method for communicating via a transmission channel to which first communication apparatuses communicating based on a first communication system, second communication apparatuses communicating based on a second communication system, and third communication apparatuses communicating based on a third communication system are connected, wherein a data transmission domain and a notification domain for notifying a data transmission within the data transmission domain are allocated to the first communication apparatuses, the second communication apparatuses, and the third communication apparatuses, respectively, the communication method, comprising:
transmitting notices of the data transmission for each of the first communication apparatuses, the second communication apparatuses and the third communication apparatuses within the notification domain; and
reallocating the data transmission domain in accordance with the notice transmitted from the first, second and third communication apparatuses.

* * * * *